US007467356B2

(12) United States Patent
Gettman et al.

(10) Patent No.: US 7,467,356 B2
(45) Date of Patent: Dec. 16, 2008

(54) GRAPHICAL USER INTERFACE FOR 3D VIRTUAL DISPLAY BROWSER USING VIRTUAL DISPLAY WINDOWS

(75) Inventors: David Gettman, London (GB); Nicole Morris, Monaco (MC)

(73) Assignee: Three-B International Limited, Nassau (BS)

( * ) Notice: Subject to any disclaimer, the term of this patent is extended or adjusted under 35 U.S.C. 154(b) by 527 days.

(21) Appl. No.: 10/864,906

(22) Filed: Jun. 8, 2004

(65) Prior Publication Data

US 2005/0086612 A1  Apr. 21, 2005

Related U.S. Application Data

(63) Continuation-in-part of application No. 10/727,799, filed on Dec. 3, 2003, now abandoned.

(30) Foreign Application Priority Data

Jul. 25, 2003  (GB) ................................. 0317493.5

(51) Int. Cl.
*G06F 3/048* (2006.01)
(52) U.S. Cl. ...................................... 715/850
(58) Field of Classification Search .................. 715/850
See application file for complete search history.

(56) References Cited

U.S. PATENT DOCUMENTS 4,860,218 A   8/1989   Sleator
5,808,613 A   9/1998   Marrin et al.
5,841,440 A   11/1998  Guha et al.

(Continued)

FOREIGN PATENT DOCUMENTS

EP   1 014 257 A1   6/2000

(Continued)

OTHER PUBLICATIONS

David Cleary et al., "Creating a Semantic-web Interface with Virtual Reality," 2001, XP-002301058, pp. 138-146.

(Continued)

*Primary Examiner*—Steven P. Sax
*Assistant Examiner*—Andrey Belousov
(74) *Attorney, Agent, or Firm*—Hickman Palermo Truong & Becker LLP

(57) ABSTRACT

A graphical user interface comprising a main pane, a web button or interactive content button area, an input area, a mini map area, and a three-dimensional view area is disclosed. There are three main view that are displayed (a) three-dimensional perspective view of a virtual three-dimensional space that comprises a plurality of virtual display windows, wherein each of the virtual display windows is allocated a specific position in the space and is associated with a network location identifier of a content provider, or (b) an interactive content view of network content associated with the network location identifier, or (c) a map view comprising a map of the virtual three-dimensional space. Various map display, path generation, and navigation functions are provided. The graphical user interface provides a flexible and intuitive way to navigate a complex three-dimensional virtual space in which web pages or other interactive content are mapped to virtual display windows of virtual buildings in a virtual three-dimensional space.

17 Claims, 25 Drawing Sheets

U.S. PATENT DOCUMENTS

| | | | |
|---|---|---|---|
| 6,002,853 A | 12/1999 | de Hond | |
| 6,035,330 A * | 3/2000 | Astiz et al. | 709/218 |
| 6,036,601 A | 3/2000 | Heckel et al. | |
| 6,054,989 A * | 4/2000 | Robertson et al. | 715/848 |
| 6,232,981 B1 | 5/2001 | Gossett | |
| 6,271,843 B1 | 8/2001 | Lection et al. | |
| 6,288,730 B1 | 9/2001 | Duluk, Jr. et al. | |
| 6,590,593 B1 * | 7/2003 | Robertson et al. | 715/782 |
| 6,636,210 B1 * | 10/2003 | Cheng | 345/419 |
| 7,107,549 B2 * | 9/2006 | Deaton et al. | 715/836 |
| 2001/0019337 A1 | 9/2001 | Kim | |
| 2002/0013738 A1 | 1/2002 | Vistisen | |
| 2002/0093541 A1 | 7/2002 | Schileru-Key | |
| 2002/0105533 A1 * | 8/2002 | Cristo | 345/706 |
| 2002/0158916 A1 * | 10/2002 | Gusler et al. | 345/850 |
| 2004/0054667 A1 | 3/2004 | Kake et al. | |

FOREIGN PATENT DOCUMENTS

| | | |
|---|---|---|
| EP | 1 391 833 A1 | 2/2004 |
| JP | 7160634 A | 6/1995 |
| WO | WO 99/13423 A1 | 3/1999 |
| WO | WO 01/52462 A2 | 7/2001 |
| WO | WO 01/57643 A1 | 8/2001 |
| WO | WO 01/69364 A2 | 9/2001 |
| WO | WO 01/69386 A2 | 9/2001 |
| WO | WO 01/84295 A1 | 11/2001 |
| WO | WO 02/086766 A2 | 10/2002 |
| WO | WO 02/093352 A1 | 11/2002 |
| WO | WO 02/095625 A1 | 11/2002 |
| WO | WO 03/014970 A2 | 2/2003 |
| WO | WO 03/025823 A1 | 3/2003 |
| WO | WO 03/058531 A1 | 7/2003 |

OTHER PUBLICATIONS

Andreas Dieberger et al., "A City Metaphor to Support Navigation in Complex Information Spaces," 1998, XP-002301059, pp. 597-622.

Katsuya Hakozaki et al., "Conceptual Design of a Virtual Library for Personal Use," 1999, XP-000831491, pp. 43-51.

International Searching Authority, "International Search Report," International Application No. PCT/GB2004/003208, 9 pages.

International Searching Authority, "Notification of Transmittal of the International Search Report and the Written Opinion of the International Searching Authority, or the Declaration," International Application No. PCT/GB2004/003185, 12 pages.

International Searching Authority, "Invitation to Pay Additional Fees," International Application No. PCT/GB2004/003195, 6 pages.

Jürgen Döllner et al., "Texturing Techniques for Terrain Visualization," 2000, Proceedings Visualization 2000, Salt Lake City, Utah and Annual IEEE Conference On Visualization, Los Alamitos, CA, pp. 227-234.

Wang Jing et al., "VRML Based Collaborative Visualization for Volume Product Datasets," 2004, Computer Supported Cooperative Work in Design 2004 Proceedings, Piscataway, NJ.

International Searching Authority, "Notification of Transmittal of the International Search Report and the Written Opinion of the International Searching Authority, or the Declaration," International Application No. PCT/GB2004/003199, 3 pages.

International Searching Authority, "International Search Report," International Application No. PCT/GB2004/003199, 4 pages.

International Searching Authority, "Written Opinion of the International Searching Authority," International Application No. PCT/GB2004/003199, 7 pages.

International Searching Authority, "Notification of Transmittal of the International Search Report and the Written Opinion of the International Searching Authority, or the Declaration,"0 International Application No. PCT/GB2004/003195, 2 pages.

International Searching Authority, "International Search Report," International Application No. PCT/GB2004/003195, 7 pages.

International Searching Authority, "Written Opinion of the International Searching Authority," International Application No. PCT/GB2004/003195, 9 pages.

International Bureau, "Notification Concerning Transmittal of International Preliminary Report on Patentability," PCT/GB2004/003185, dated Feb. 9, 2006, 7 pages.

Current Claims, PCT/GB2004/003185, pp. 79-125.

* cited by examiner

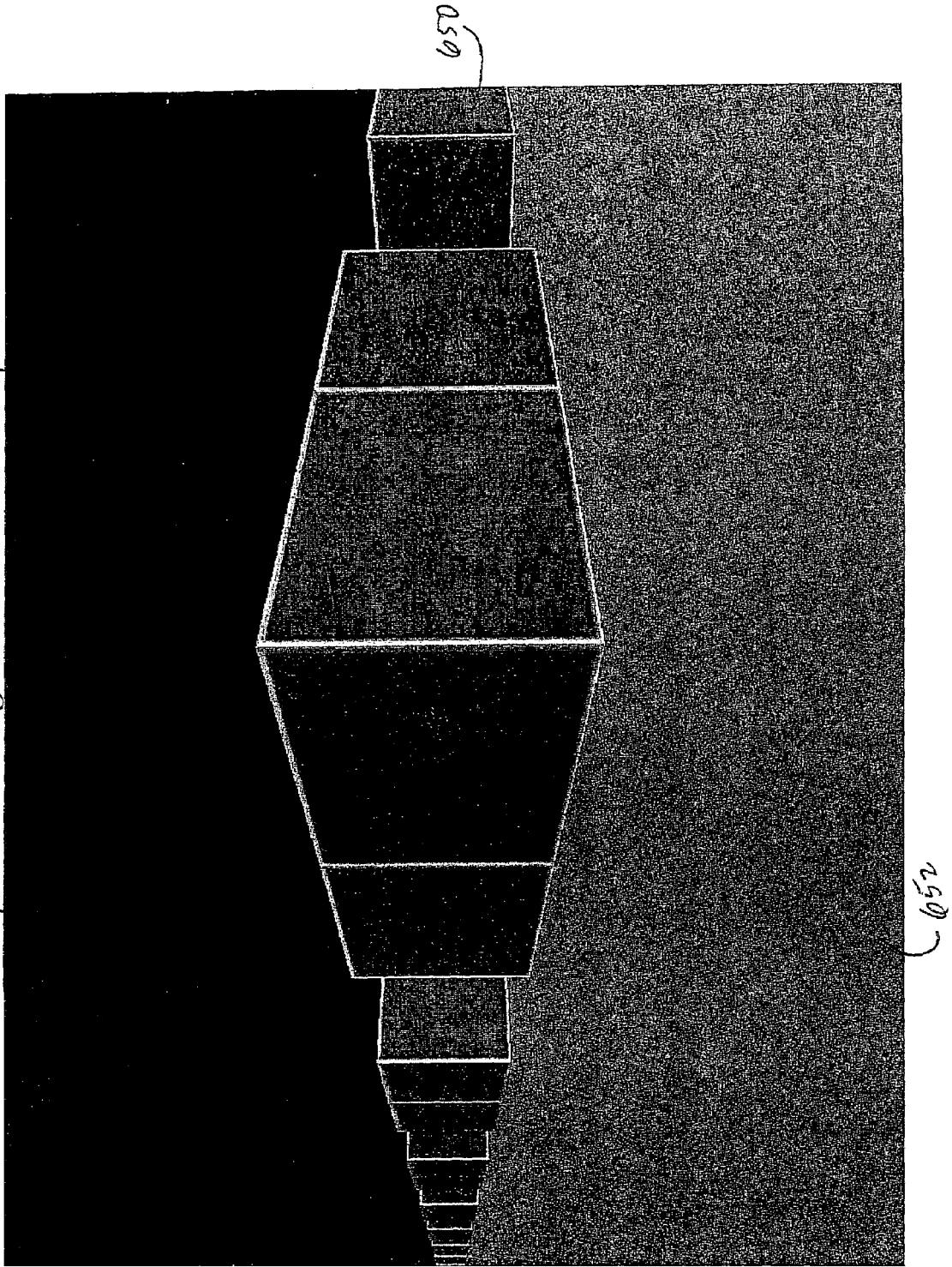

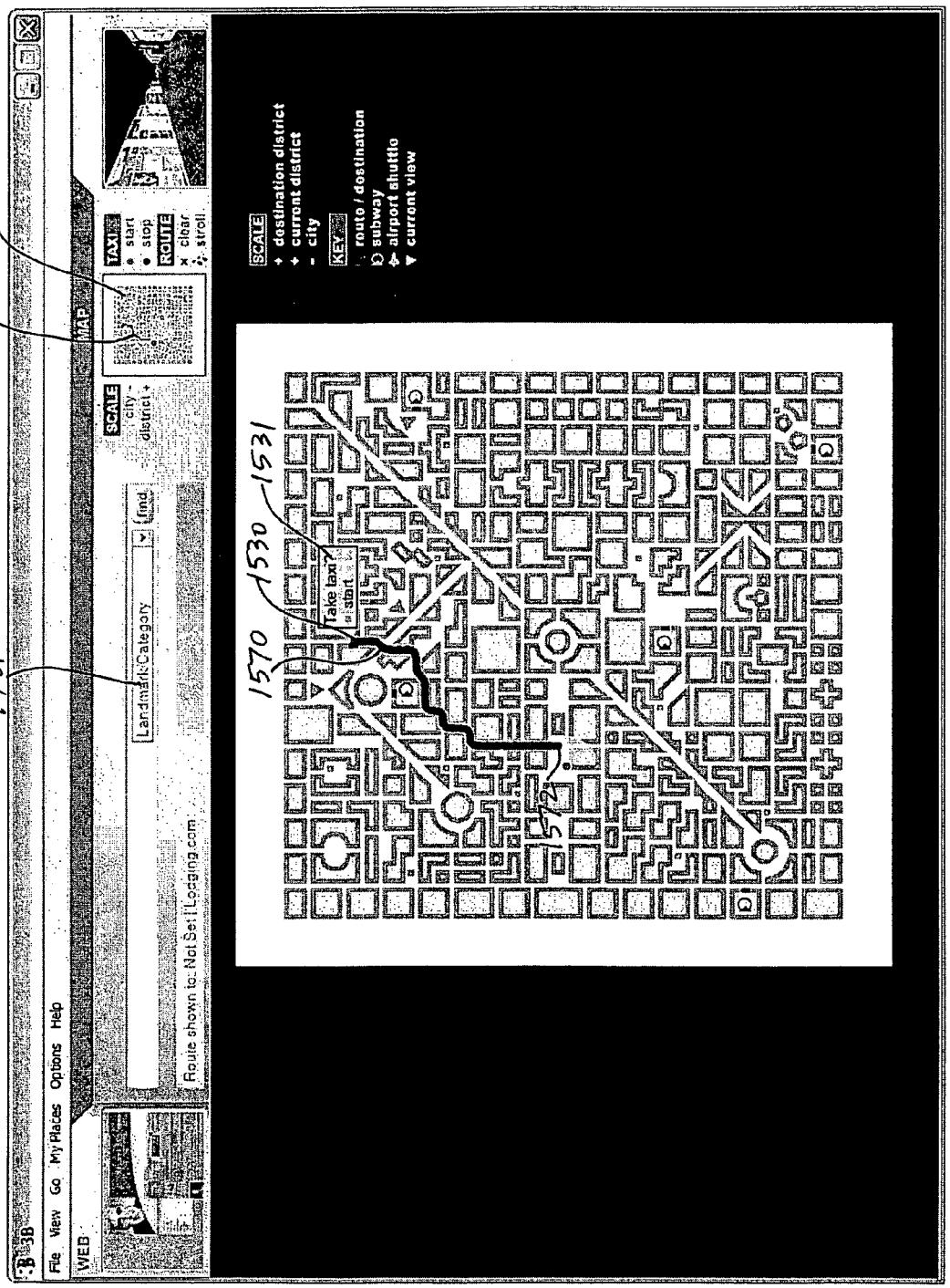

Fig. 16

GRAPHICAL USER INTERFACE FOR 3D VIRTUAL DISPLAY BROWSER USING VIRTUAL DISPLAY WINDOWS

CROSS-REFERENCE TO RELATED APPLICATIONS; PRIORITY CLAIM

This application claims the benefit under 35 U.S.C. §119 of prior United Kingdom application 0317493.5, filed Jul. 25, 2003, entitled "Information Display," the entire contents of which is hereby incorporated by reference as if fully set forth herein. This application claims priority under 35 U.S.C. §120 as a Continuation-in-part of prior application Ser. No. 10/727,799, filed Dec. 3, 2003 now abandoned, the entire contents of which is hereby incorporated by reference as if fully set forth herein.

COPYRIGHT NOTICE

A portion of the disclosure of this patent document contains material which is subject to copyright protection. The copyright owner has no objection to the facsimile reproduction of the patent disclosure, as it appears in the Patent & Trademark Office patent file or records, but otherwise reserves all copyright rights whatsoever. Copyright ©2004 Purple Interactive Ltd.

FIELD OF THE INVENTION

The present invention generally relates to data processing. The invention relates more specifically to information display.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Modern display or presentation devices typically include computer apparatus such as networked, desktop, laptop, handheld or tablet personal computers (PCs), personal digital assistants (PDAs), interactive television terminals, gaming apparatus and cell phones. Each item of apparatus usually has a single display, and this may be in the form of a traditional computer, television or cell phone display screen or may take the form of projection equipment, virtual reality goggles, projection spectacles, holographic projections, electronic paper or cerebral implants.

There is a desire amongst viewers accessing a large volume of material content to be able to browse and navigate the full set of content in order to find a subset or single unit of content which is relevant or interesting to the viewer. Currently such browsing and navigation is typically conducted by means of descriptive text typed into search engine software and thereby matched to text contained in the material content itself or to text which a content provider has used to label the content. Browsing and navigation is also sometimes aided by third-party content categorizers who provide directories and sub-directories of content labels and descriptions.

However, these techniques for browsing and navigating large volumes of material content for display inevitably rely upon the individual viewer's skills in language and logic, as well as that of the content providers. With directory searching, the viewer must guess and replicate the logic followed by the third-party content categorizers, who must categorize and describe material content accurately and in a way which will readily be found by the intended viewers. With text entry searching, viewers need a good verbal memory to think of appropriate search terms, an extensive vocabulary, and skills in using Boolean logic in order to enter the most effective text, and content providers must accurately guess which keywords will be entered by viewers searching for their material content.

BRIEF DESCRIPTION OF THE DRAWINGS

For a better understanding of the present invention and to show how the same may be carried into effect, reference will now be made to the accompanying drawings in which:

FIG. 6D is a diagram of a virtual city grid screen display generated by one embodiment of an information display method;

FIG. 15B is a diagram of the screen display of FIG. 15A with a route displayed.

FIG. 16 is a diagram of the screen display of FIG. 15A showing a display of virtual display windows that match a selected category.

DETAILED DESCRIPTION OF THE PREFERRED EMBODIMENT

Figure 1:
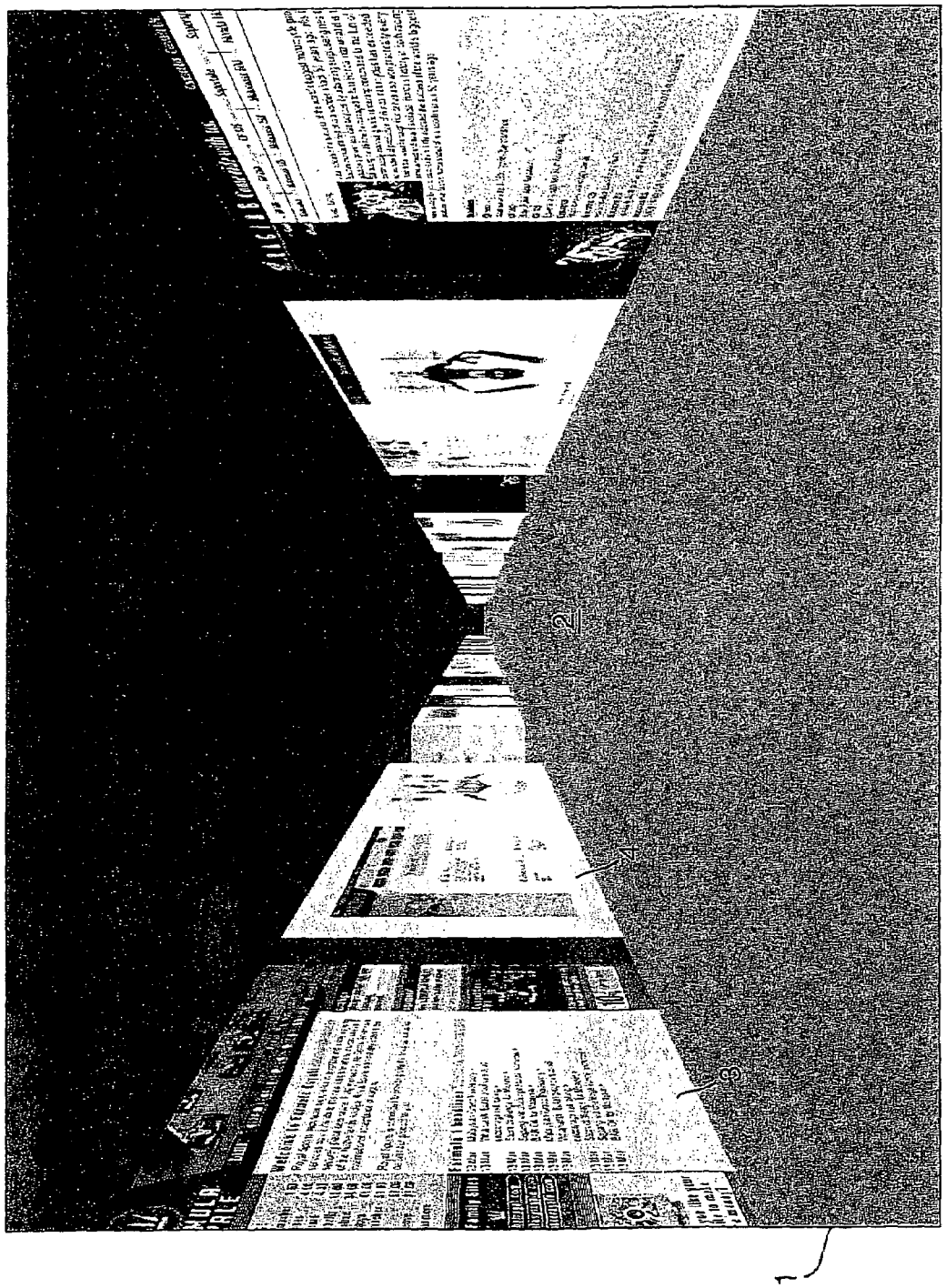
FIG. 1 is a diagram of a screen display generated by one embodiment of an information display method.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Implementation
   2.1 Overview of User Interface and Browsing Methods
   2.2 Structural Overview; City Server Architecture
   2.3 Establishing City Content; Browsing City Content
   2.4 Renewals, Auctions and Transfers of Virtual Property
   2.5 Three-Dimensional Virtual Space Browser Architecture
   2.6 Graphical User Interface Implementation Example
3.0 Hardware Overview

1.0 GENERAL OVERVIEW

The invention is a method of organizing and displaying a large volume of material content in a manner that can be easily browsed and accurately navigated by a viewer without relying upon the viewer's, nor the content providers', skills in language or logic.

The material content may be information in any form, for example: data, numbers, text, still images such as photographs and graphics, moving images, virtual control panels and sound. It may be retrieved from a local computer disk or removable storage media or any form of network such as a local area network, a wireless network, a cell phone network, a wide area network, an internet, extranet or the Internet. The invention may, for example, be used for displaying material content on a computer screen and navigating through the type of material content typically found on the Internet.

According to one aspect of the present invention there is provided a method for organizing and presenting material content on a display to a viewer, the method comprising: mapping a plurality of display windows within a virtual three-dimensional space so that each display window is allocated a specific and predetermined position in the space, rendering each display window in three-dimensional perspective according to its position and angle relative to a viewer's virtual position in the virtual space, cross-referencing the position of each display window to a storage location of the material content that is designated to be rendered in that particular display window at a particular time based on at least one predetermined condition, allocating at least part of the three-dimensional virtual space to display windows whose content is not chosen or determined by the viewer, selecting, retrieving and preparing material content for possible subsequent display, according to a predetermined algorithm, selecting and rendering prepared material content within its cross-referenced display window, according to a predetermined algorithm, and providing a means of virtual navigation that changes the viewer's position in the space in such a manner as to simulate movement through a plurality of predefined channels in the virtual space.

A browser adapted to perform this method is also provided, as is apparatus programmed to operate the browser.

According to a second aspect of the present invention there is provided apparatus for organizing and presenting material content on a display to a viewer, the apparatus comprising: a display, means for mapping a plurality of display windows within a three-dimensional virtual space so that each display window is allocated a specific and predetermined position, means for rendering each display in three-dimensional perspective according to its position and angle relative to the viewer's position in the virtual space, means for cross referencing the position of each display window to the network address or storage location of the material content that is designated to be rendered in that particular display window at a particular time based on at least one predetermined condition, means for selecting, retrieving and preparing material content for possible subsequent display according to a predetermined algorithm, means for selecting and rendering prepared material content within its cross-referenced display window according to a predetermined algorithm, and means for navigation controlled by the viewer that changes the viewer's position in such a manner as to simulate movement through a plurality of predefined channels in the virtual space.

According to a third aspect of the present invention there is provided a virtual space manager comprising a content configurator that includes the interface for the creation, maintenance and updating of the configuration which incorporates a plurality of cross references of content material to render in display windows.

According to a fourth aspect of the invention the method of the first aspect may be adapted as a business method for example when used to supply in exchange for financial payment the right to specify the network address or storage location of material content that is to be rendered in a particular display window at a specified location at a particular time, and optionally enabling and recording the transfer of rights in exchange for financial payment, and/or providing an auction system inviting financial bids to the current holder of rights and awarding the rights to the highest bidder provided predetermined conditions are met, and/or providing advertising opportunities in the three-dimensional virtual space in exchange for financial payments.

In addition, a viewer's navigation into a restricted area of the three-dimensional virtual space is allowed for a particular period of time in exchange for financial payment. Added value services may also be provided in exchange for financial payments, e.g. avatar companions, guides to navigation, the ability to navigate simultaneously and interactively with one or more other actual viewers, e-commerce support, and financial services including foreign exchange, credit and budget planning.

The method of the invention may be used to enable any one or more of Internet browsing, virtual stores, virtual supermarkets, virtual shopping malls, virtual retail catalogues, knowledge management, virtual exhibitions, medical records management, virtual hospital patient management, virtual galleries, virtual museums, entertainment choices, tourist guides, TV guides, news digests, travel/hospitality option guides, virtual trade fairs and photo libraries.

According to a fifth aspect of the invention there is provided a browser for retrieving pages of material content over a computer network, comprising means for selecting material content for display according to a predetermined algorithm, means for cross-referencing the position of each display window to a storage location of selected material content based on at least one predetermined condition, means for allocating at least part of the three-dimensional virtual space to display windows whose content is not chosen or determined by the viewer, and means for retrieving and rendering selected material content within its cross-referenced display window according to a predetermined algorithm.

According to a sixth aspect of the invention there is provided a business method comprising offering to download a browser (according to the fifth aspect) to a plurality of potential viewers and offering the display windows in the virtual space for rent to potential rights owners in the form of business and commercial enterprises.

The present invention has advantages because it does not rely upon language and logic in browsing and navigating large volumes of content. Instead of relying upon language and logic, the invention makes it possible to indicate the relevance of content to a viewer by applying a rule of spatial proximity. Specifically, if content A is relevant to the viewer, and content B is similarly relevant, then A and B can be positioned near to one another, so that the viewer of content A is likely also to see content B with a minimum of navigation.

In order to apply the rule of spatial proximity to material content in displays, the present invention may utilize and uniquely combine three methods:

(1) The creation of a three-dimensional virtual space containing many display windows in fixed, specified positions, (2) The realistic topographical navigation of this world by viewers, which prevents them jumping instantly from one display window to any other, but instead forces them to travel smoothly along surface channels that expose the viewer to other display windows along the way, and (3) The operation of a self-organizing allocation process in which content providers compete for the most beneficial display window positions for their content.

Corresponding to these three methods are three forms of prior art which make clear the novelty of the present invention:

(1) The creation of a virtual three-dimensional world of display in fixed, specified positions.

A browser that also configures display windows in three dimensions is described in International Patent Application Publication Number WO 01/82295. This describes a browser that arranges HTML pages on the back, top, bottom, left and right inside faces of a cube, with the viewer positioned just inside the nearest (sixth) face. Each of the five navigable inside faces can open into a further cube. The aim is to enable the viewer simultaneously to see several pages selected by the viewer. This could be especially useful where the content on the five pages is being compared or contrasted.

The present invention differs from this disclosure in several respects: in particular because the display windows in the present invention have fixed, specified positions in the space rather than being subject to manipulation by the viewer, and the content on display is predetermined by cross-references rather than by the viewer.

(2) The realistic topographical navigation forcing the viewer to travel smoothly along the surface and thus be exposed to display windows on the way.

Another method for searching and presenting information in a geography-based configuration which also provides realistic navigation is described in U.S. Patent Application Publication Number US 2002/0059207 A1. This method converts multiple aerial photos of an actual city into a three-dimensional stereoscopic aerial view, and allows the viewer to move across this view, simulating a 'sight-seeing flight', and to request information pertaining to his or her location. This is done by linking the latitude and longitude of the viewer's position with 'landmark databases' compiled using conventional Internet searches based on keywords or other verbal expressions. Multiple viewers can interact and be tracked.

The present invention differs from this disclosure in several respects: the content being presented in the present invention is organized by predetermined cross references rather than by reference to their physical property locations, and material content is directly displayed in windows forming part of the landscape being viewed rather than indirectly displayed as separate page data.

(3) A self-organizing allocation process in which content providers compete for the most beneficial display window positions for their content.

Another method comprising a self-organizing allocation process for the display of large volumes of material content is described in U.S. Pat. No. 6,308,202. This method invites each primary content provider on the Internet to select one or more of thousands of verbal categories to describe their content and then allows other secondary content providers, for example advertisers, to supply relevant additional information to anyone viewing the primary categorized content. By allowing both primary and secondary content providers to determine the categories they believe are most relevant to their content, the allocation of secondary information to interested viewers is optimized. The present invention differs from this disclosure in several respects, particularly since material content in the present invention is displayed in predetermined cross-referenced display windows. In embodiments of the present invention: content providers select relative positions in a virtual space to describe their content rather than use verbal categories; the exposure of viewers to relevant secondary content is achieved by virtue of the required realistic method of navigation, rather than it being imposed as a separate unrequested display of content; and due to the competitive nature of the self-organizing process, the 'description' (i.e. the position in the virtual space) assigned to any particular material content reflects not just its meaning but also the value ascribed to that content by its provider.

The present invention benefits both content providers and content viewers:

Content providers using embodiments of the invention have control over where and how their content is seen in the context of all content, rather than granting that control to third-party content categorizers or the rule-makers of search engine software. Content providers using embodiments of the invention also need not rely on verbal descriptions (e.g. domain names, meta-text, directory entries, or descriptive advertisements) to attract interested viewers, but instead can attract relevant viewers to their content by means of its contextual position and the quality of its visual treatment. Because the self-organizing is competitive, the prominence of displayed content is commensurate with the importance of the communication to the content provider.

Viewers using embodiments of the invention can rely upon the naturalistic, non-verbal experience of perceiving the relatedness of two entities by their spatial proximity, rather than relying upon terms or names they happen to recall, or entering topics into search engines in accordance with Boolean logic. Viewers can also more rapidly decide the relevance of content by relying on quick visual impressions rather than reading lists of arbitrary text excerpts. Lastly, viewers using embodiments of the invention can experience the serendipity of discovering new, hitherto-unknown content, or content that its provider considers to be of interest to them, rather than being limited to content that the viewer has had to search for and therefore must already know about.

The present invention enables the designation and fixing of the association of material content with other material content in a three-dimensional space containing display windows that are each rendered in three-dimensional perspective. In one embodiment of the present invention, the configuration of these display windows, each containing material content, is analogous to shop windows on a city street.

To populate this system with content, content providers may be invited to specify their material content to appear in a particular window which by virtual spatial proximity associates their material content with what they consider to be related material content in surrounding and nearby display windows. In this way, associated content, presented in display windows, will self-organize into virtual neighborhoods of related content that the user can browse as one would the shop windows along streets of a city. Having located a display window with content of interest to the user, the user may without verbal or logical discernment easily find other content in nearby windows that its providers have decided would also be of interest to the user.

In still another aspect, an embodiment provides a graphical user interface comprising a main pane, a web (or content) button area, an input area, a mini map area, and a 3B button area is disclosed. The main pane selectively displays either (a) three-dimensional perspective view of a virtual three-dimensional space that comprises a plurality of virtual display windows, wherein each of the virtual display windows is allocated a specific position in the space and is associated with a network location identifier of a content provider, or (b) a web page or interactive content view of network content associated with the network location identifier, or (c) a map view comprising a map of the virtual three-dimensional space. Various map display, path generation, and navigation functions are provided. The graphical user interface provides a flexible and intuitive way to navigate a complex three-dimensional virtual world in which web pages or interactive content are mapped to virtual display windows of virtual buildings in a virtual city.

2.0 EXAMPLE IMPLEMENTATION 2.1 Overview of User Interface and Browsing Methods In FIG. 1 a display 1, which may be a screen of a computer, is shown, on which is depicted an image of a virtual street 2 seen in three-dimensional perspective from the middle of the street 2. Buildings 3 are located on each side of the street 2, and each has one or more virtual display windows 4 facing the street 2. The buildings and the street decrease in size, appearing to recede, as they get further from the nominal position of the viewer. The angle of recession is chosen so that the perspective appears natural but so that content displayed in the display windows on the sides of the buildings is clear. The relative width w and height h of each display window 4 is chosen to match the content to be displayed, but in the embodiment using Internet pages is chosen to match that of the normal visible HTML page area in a traditional Internet browser, i.e., the standard screen size minus the space used by scrollbars and tool bars. This gives the viewer the impression that he is standing in a street having shops with shop windows on each side. Each virtual display window 4 shows a page of content retrieved from an Internet HTML page. These may be the home pages of commercial concerns or pages specially generated for display in this format.

The actual number of visible display windows will be chosen so that the overall view looks realistic and so that a reasonable number of the windows are clearly visible. The number can be variable in dependence upon the performance of the computer or adjustable by the viewer to enhance performance or to enhance the detail of rendering of content in the windows. For example, it may be appropriate to display two blocks of the street at a time and three windows on each side in each block but to replace the more distant windows with a low-resolution rendering or even a small icon.

The viewer's viewpoint can be moved up or down the street 2 and as it is moved, the display changes to bring other windows 4 into view and to change the relative sizes of the displayed buildings 3. The changes must be accomplished realistically and smoothly. The viewer can also turn left or right to face a particular window to inspect more carefully the content displayed there. If the content comprises Internet HTML pages then at that point the HTML page displayed in that window can be opened by the viewer to fill a separate Internet browser of more traditional two-dimensional appearance. Optionally the viewer can then interact with the chosen HTML page in the traditional manner, for example by using mouse clicks on a part of it to access another page of information or to make a choice such as initiating a purchase from a shopping system represented on the page.

The street 2 is part of a larger virtual space such as an urban landscape in the form of a town or city set out in a grid-like city block layout although the layout of the landscape need not necessarily be in the form of a uniform perpendicular grid: "curved roads" and "traffic circles" may be incorporated and narrow "paths" may lead off from wider "streets". "Hilly" surfaces and "ravines" or other geographic representations may be included. The virtual space may be limited or infinite or limited in some directions and may be on more than one plane. The display windows will typically have straight edges as shown in FIG. 1, but may be made more eye-catching with decorated frames.

The viewer can navigate through the landscape by making appropriate key strokes on the keyboard, by mouse movements or by using a joystick, track pad, trackball, touch screen, remote control or virtual reality gloves or a steering wheel, in manners known to persons skilled in the art. Several navigation speeds are envisaged which would generally be under the control of the viewer. For example the viewer may "move" at walking speed through the "streets" or may choose to move at the equivalent speed of a taxi, within the same plane as the display windows. The viewer may also opt to move at an even higher speed in a different plane to the display windows, for example in a manner analogous to a subway system or a helicopter. However it is intended that limits would be applied to the viewer's "movement" through the landscape to avoid the possibility of the viewer instantly jumping to a specified display window location in the landscape because such a movement would undermine the organizational principle that enables the viewer to find relevant content: namely, content providers locating their content in virtual spatial proximity to associated content.

Each display window 4 may be sold or rented to a commercial concern or other organization and has a fixed position in the landscape, in a similar manner to the fixed addresses of shops or businesses in a real town or city. In this way the viewer becomes familiar with the positions of his or her favored windows and can easily search and select relevant "neighborhoods" of material content.

The display is organized by a controlling browser program operating locally, e.g. on the viewer's computer terminal. The browser program controls the display of the virtual landscape, navigation of the viewer's position through the landscape, and the retrieval, preparation and rendering of content displayed in each window. In an internal or external cross-referencing file, the URL of the Internet HTML page of each relevant commercial concern owning or renting a display window is associated in the program with the specific display window the concern has reserved. Periodically, bitmap screenshots of a set of HTML pages relevant to the windows in the local vicinity of the viewer in the landscape (e.g. those associated with all of the display windows in the blocks and streets adjacent to or around the corner from the viewer) are cached in local memory. In one implementation, this uses an adapted HTML page-rendering engine which can import live HTML pages in a way in which their contents are reproduced dynamically. Thus a set of live HTML pages is continuously saved in memory at the viewer' terminal. The number of HTML pages thus saved will depend upon the available memory and the processing power of the terminal as well as the number of windows displayed on the screen at any one time, but might typically be 9.

When a window first becomes visible in the viewer's screen, the corresponding cached HTML page is copied by the program from the internal memory and rendered in the window. The page is not rendered dynamically until the viewer turns toward it (and "clicks" on it or remains in that position for a set period of time), at which stage the dynamically cached page may be displayed in a two dimensional, conventional-style browser display box. Totally live dynamic rendering of all visible HTML pages in-situ on a street would be possible with sufficient processing power.

As the viewer "moves" along the street, distant windows come into view and close-by ones pass out of sight "behind" the viewer. Thus the program carefully selects the set of HTML pages to cache and store in memory to ensure a smooth and fast appearance of rendered display windows as the viewer "moves", by ensuring that HTML pages corresponding to approaching windows are downloaded into memory in time. A certain amount of predictive programming must be built-in to anticipate the next likely "movements" of the viewer, for example on the basis of previous navigation patterns.

It is envisaged that facilities will be provided on an administration Internet site to allow the registration of the rights of content providers to own or rent particular display windows, to manage transactions (e.g. taxes and fees), and to allow a display window owner or tenant to upload directly their network address or storage location and maintain their display window. The rights holder may test the appearance of their display window and view statistics or contour maps indicating the number and frequency of visits to their window and/or simulations of corresponding virtual "property values".

There may be a number of different neighborhoods or districts in the virtual city, each with its own distinctive layout and look and feel, just as in a real city. For example, there may be an area in which HTML pages of interest to young people predominate, or an area which specializes in public sector content. In one embodiment, a particular area of the "city" is designated as the viewer's "hometown" area and is populated, for example, with the viewer's own favorites or bookmarked HTML pages, or with pages found from a conventional search.

Different sections of the virtual city could be designated "gated" areas which would be accessible only to users with a special subscriber pass: given either by virtue of payment made by the viewer in advance or for example on condition that the viewer has proven that they have a sufficient credit rating for financial transactions within the "gated" area or are a member of a club.

The layout of the "city" is detailed in a standard format XML file in the form of plot data, which in the example given is for a three window by three window city block grid layout, although other layouts are possible. The XML file may be contained in the control program loaded on the viewer's computer (the client) or may be retrievable from a remote server via a standard HTTP connection in which case there will be security to protect the integrity of the file.

Any of the pages may incorporate sounds but it is most practical to suppress sounds from pages other than those closest to the viewer. For example sound on the pages in the windows directly to the left and the right of the viewer's nominal position could each be set at a volume of 50% in the left and the right stereo channels respectively. If a viewer turns to face a page then that page plays at 100% volume. When a page is more than half way out of view the volume is lowered to 25%, and the volume of the next page is increased to 25%.

As already mentioned, navigation may be performed by keyboard strokes, mouse movements or a joystick. Traditionally the arrow keys on a keyboard are used for movement e.g. in one implementation when the "up" key is depressed the viewpoint moves forward at a predetermined pace, and releasing the "up" key stops the viewpoint at the next full window, i.e. at the point when the nearest vertical edges of the windows abut the left and right vertical edges of the display area. Pressing the "down" key moves the viewer back (while facing forward) and the "left" key makes the viewer turn to face the window to the left. Likewise the "right" key is used for a right turn. At intersections of "streets" the "right" key turns the user right onto the perpendicular "street" and the "left" key turns the user left onto that "street".

More advanced forms of navigation can be incorporated, for example using a variety of keys, mouse-movement controls and right-click shortcuts and these are well known, particularly in the field of video game programming and usage.

In one embodiment there is an experience simulating transport by underground train built into the virtual city. Several display windows throughout the virtual city are rendered to appear as underground train stations and the viewer can "enter" a station by turning to face the relevant display window, using an appropriate navigation technique. A diagrammatic map of all "underground train stations" is then displayed to the viewer "in" the station and he can then select a destination station by "clicking" on the appropriate part of the map to travel to a different part of the "city". A typical long distance "journey" might take 10 to 15 seconds and during this simulated journey the control program activates the display to the viewer of a series of advertisements which would typically be paid for by the owners of the display windows near the destination station. This would be analogous to advertising hoardings at real underground train stations and on real underground trains. At the destination station in a different part of the virtual town, the viewer would "exit" the station through another window rendered as a train station and emerge into a street rendered with the HTML pages chosen by owners of display windows in that part of the "city".

The virtual city is typically entered only via designated gateways or portals to facilitate the viewer's familiarity with and navigation through the landscape. There is a single major "default" gateway, and a series of secondary gateways which can be selected from a map or menu or randomly offered to a viewer. The underground train stations would comprise some of the secondary gateways. Gateways could be depicted in striking or memorable designs to aid navigation.

The selection of which gateway is used to enter the virtual city can be made by a viewer each time the program is launched but if no selection is made then the entry gateway will default to the main gateway.

A bird's-eye view topological map of the whole virtual city or the neighborhood or district in which the viewer is located at any one time is displayed, either adjacent to or behind the main viewing window. The path taken by the viewer may be highlighted on this map, either for the current session alone or for the current and at least one previous session. A zoom option would also be provided, leading to the display of larger, more detailed maps. Such a map may have certain "landmark" display windows marked, these possibly being determined by the owners having paid a fee to appear on the large scale maps. When navigating the main window in the usual way, the viewer may also be allowed to rise up above the virtual space to get an overview of his current location and environs in the virtual city.

Locations visited by a viewer could be "bookmarked" or "searched for" in the traditional manner. However, the viewer is unable to jump directly to a bookmarked or search result location but must instead travel along the streets to reach it, in one embodiment guided by the most efficient route being highlighted on the map or automatically led there through the streets. In this way the viewer will find his or her way around the virtual landscape and will learn the positions of particular Internet sites. In addition, this inability to jump means that the viewer must pass many display windows and the owners or tenants of those windows will have the advantage of more viewers seeing their content.

An avatar may represent the viewer and/or a shopping companion; for example an amusing pet or an attractive imaginary friend may be depicted on the screen. Such a companion could move just in front of the notional position of the viewer and might point out new window displays, changes, promotions, sales or windows which are considered likely to interest the viewer on the basis of past navigational behavior. Several viewers can "window-shop" together if they are logged on simultaneously. In this embodiment there is a system for assigning navigation control to one of the group. A means of communicating between the viewers, such as a text or voice chat line for conversation, or an on-screen messaging facility, may also be incorporated and the technology for such features is well known.

Viewers could also be given a visual representation of the number of other viewers in their current vicinity: for example a translucent silhouette of one person representing one thousand, or one million, other viewers. This would serve to indicate the relative popularity of neighborhoods, streets and windows and would also assist window owners or tenants to determine the effect of a change in their display or to assess the advantage of paying more "rent" or a higher "purchase price" for a display window in a busier, more popular part of the city.

The virtual buildings could have several stories, allowing different levels of windows, analogous to different stories of a shopping mall in real life. To the elevations of these virtual buildings where a display is not practicable could be affixed advertisements or virtual signs relating to the display windows immediately below them, providing a means of attracting viewers to navigate their way towards the advertiser's display window.

Streets and neighborhoods may be assigned names to assist in navigation for the viewer and to facilitate the sale or rental of prime locations. Landmarks may also be incorporated to assist the viewer in navigation. For example statues, architecturally interesting buildings such as distinctively decorated or designed buildings, fountains and parks may be used to identify specific areas of the landscape.

Adjacent windows could be merged to create larger windows and several different virtual cities could be created and linked by a rapid transport system in a similar way to the underground railway described above.

In a more advanced embodiment viewers will pass "through" the windows and the screen will then display a virtual rendering of the "inside" of an associated establishment. Thus, for example, the display window of a supermarket can be a gateway into the virtual supermarket itself and on "entering" the window the viewer would see the virtual "streets" become virtual aisles of the supermarket. Instead of displaying HTML pages of internet sites in the windows lining the aisles, HTML pages of sets of product images are displayed and a "click" on an individual product initiates a dialog box to display product details as supplied by the retailer: for example, ingredients or other details or the sizes, prices or colors available. A transparent interface with the retailer's own existing shopping cart may be provided in the control program.

The virtual town may be replaced by other virtual three-dimensional spaces in addition to the above example of a virtual department store, supermarket or retail catalogue establishment. A virtual shopping mall would be populated with display windows representing a variety of shop fronts or a virtual museum with exhibition cases or exhibits. Other applications are envisaged such as virtual tours of representations of actual cities, virtual trade fairs, virtual photo libraries, entertainment choices (e.g. videogame selection), TV program selection, or business or academic libraries. It would also be possible to use this method to access technical data or medical records.

Viewers are requested to register their details and their navigation behavior could be collected for sale to display window owners or tenants.

Display window owners or tenants can utilize the top portion of the window for a display sign or banner of their name label or brand for the convenience of the viewers.

Many further advertising "signs" and "hoardings" could be incorporated such as to resemble hanging signs and sandwich signs outside a shop window, as well as display advertisements on the floor of the street outside a window or directing viewers to a particular window.

From a technical point of view, the browser software preferably comprises two sections. A first section, running at high priority, controls the display of the virtual three-dimensional environment (e.g., the virtual city) and the navigation of the viewer around that environment. A second section, running at lower priority, updates the content for display windows.

Figure 2:
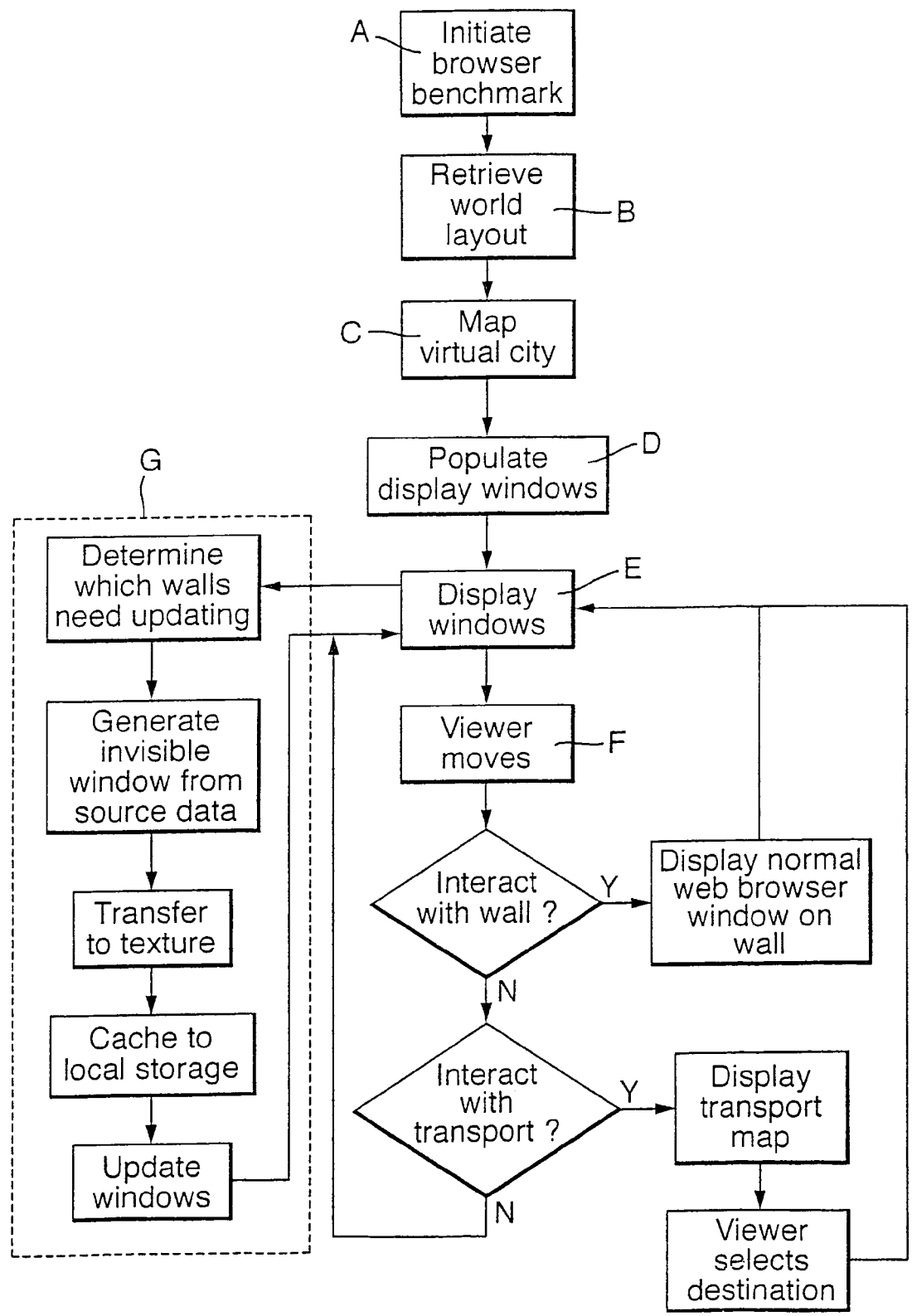
FIG. 2 is a flow diagram illustrating the sequence of steps of an information display method.

Steps taken by one embodiment of such a browser will now be described with reference to the flow diagram of FIG. 2 for operation of the software when installed on a network with the viewer using a client computer terminal connected via HTTP to a remote server computer.

In step A, the browser is first initiated and may run several brief benchmarking tests to determine the optimal settings that will ensure a smooth and responsive display. This benchmarking is determined by assessing the resources available, i.e. the computing speed, graphics card, and memory capabilities of the client computer.

In step B, the browser then retrieves the layout of the virtual space or world to be displayed (e.g. the virtual city) from the remote server computer or a file saved locally.

In step C, the retrieved layout is used by the software to map the virtual city for internal use by the viewer's computer (the client) and the browser generates a simulated three-dimensional environment depicting display windows closest to the nominal position of the viewer, for example at the default gateway. The perspective is adjusted to ensure that items closer to the nominal position of the viewer are larger. Each display window 4 has a relative width and height to match (or have similar proportions to) that of the visible HTML page area in a traditional Internet browser. This would typically be the standard screen size minus the space used by scroll bars and toolbars. The size of the display windows, resolution of the graphical textures in the display windows and number of rendering threads depends upon the benchmark conditions established in the initialization process. For illustration purposes, blocks of three display windows length and width are considered as shown in FIG. 1, but any configuration would be possible. The browser then assigns addresses, typically URL addresses for HTML pages, to each window according to the retrieved layout.

In step D, cached HTML pages stored as textures in the client computer memory are used to populate the display windows in memory.

In step E, the browser displays the three-dimensional environment on the display.

In step F, the viewer can move around in the area of the street or corridor 2 between the display windows 4 and the viewer can interact with individual display windows 4. The browser also enables the viewer to interact with an underground railway station and in that case displays a map of available underground railway destinations from which the viewer can make a selection.

In step G, the browser has several threads running simultaneously, each processing material content and updating the texture used for the respective display windows. These threads comprise the following procedures:

- an algorithm running in a control thread determines which display windows require updating based on a number of factors including the locality of the user and the age of displayed content,
- the browser may initiate a connection to download the source data,
- source data is used to generate an invisible window,
- the contents of the invisible window are transferred into a texture,
- the textures are periodically cached to a local storage medium to permit a rapid repopulation of the environment when the browser is next run,
- display windows closest to the viewer which contain moving images or sound may be kept active so that changes are continually reflected on the display window in real time.

Log files may be used for recording the frequency with which viewers pass-by, draw close to, or interact with any display window, and thus data can potentially be provided in summary to commercial owners and tenants either free or for consideration. Such data can be displayed as a contour map indicating traffic densities across the virtual space.

The technical approach described here involves the textures used for the display windows being rendered by the client program. In an alternative technical approach, a centralized cluster of servers could create the textures, and these could be downloaded by the client program.

It will be seen that the display and navigation methods of the present invention can be used in business methods to raise revenues.

For example, the virtual space may be used in an analogous way to any property space and new properties can be sold or leased, ground rents and service charges imposed, property tax applied to transfers of window rights, an administration charge made for sales, and procedures adapted to re-possess voided leases. In addition, advertising space, markings and signage can be leased, virtual moving advertising carriers included (e.g. vans or floating items), avatar shopping guides provided, and coupons could be distributed to viewers passing a particular window. Advertising agencies can act as virtual property agents for clients and virtual outdoor media owners can act as display window aggregators. Multiple interlinked three-dimensional "worlds," each containing one or more "cities," can be represented, and technology companies could each host separate such "worlds."

In addition, road tolls, gateway tolls, admission fees and transport charges could be built into any model.

By analogy with e-commerce business methods, a sales tax could be imposed on viewers transacting with content providers. An auction system could be used to enable display window rights owners to buy or sell their rights to others. The presentation, display and navigation method has many possible applications. Apart from the HTML browsing and virtual shopping embodiments described in detail above, virtual entertainment guides, tourist guides, trade fairs and travel/hospitality guides could be created. The method also finds application in displaying the contents of libraries, photo libraries, scientific data, and medical records and it could play a role in virtual government.

Figure 3:
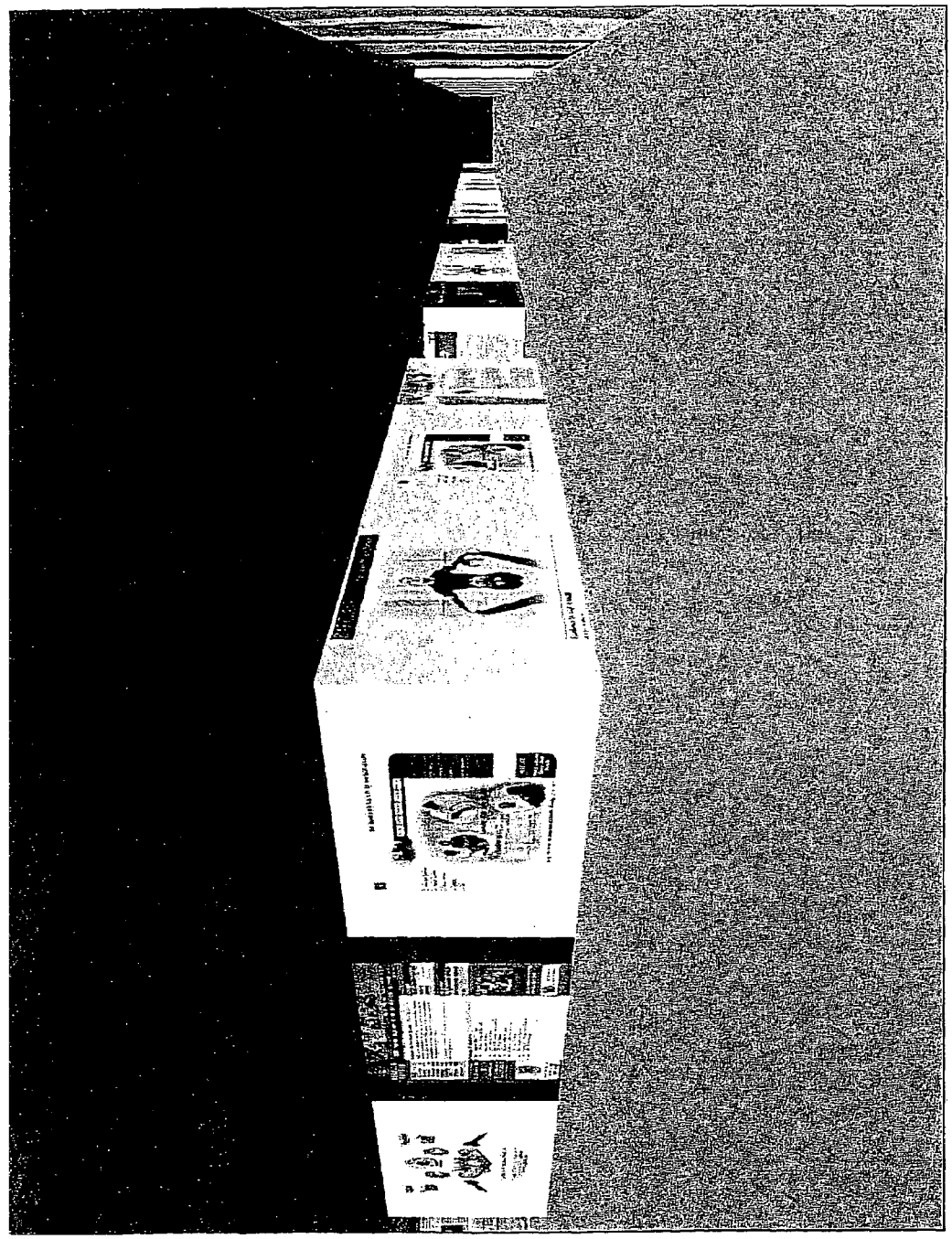
FIG. 3 is a diagram of a screen display generated by one embodiment of an information display method.
Figure 4:
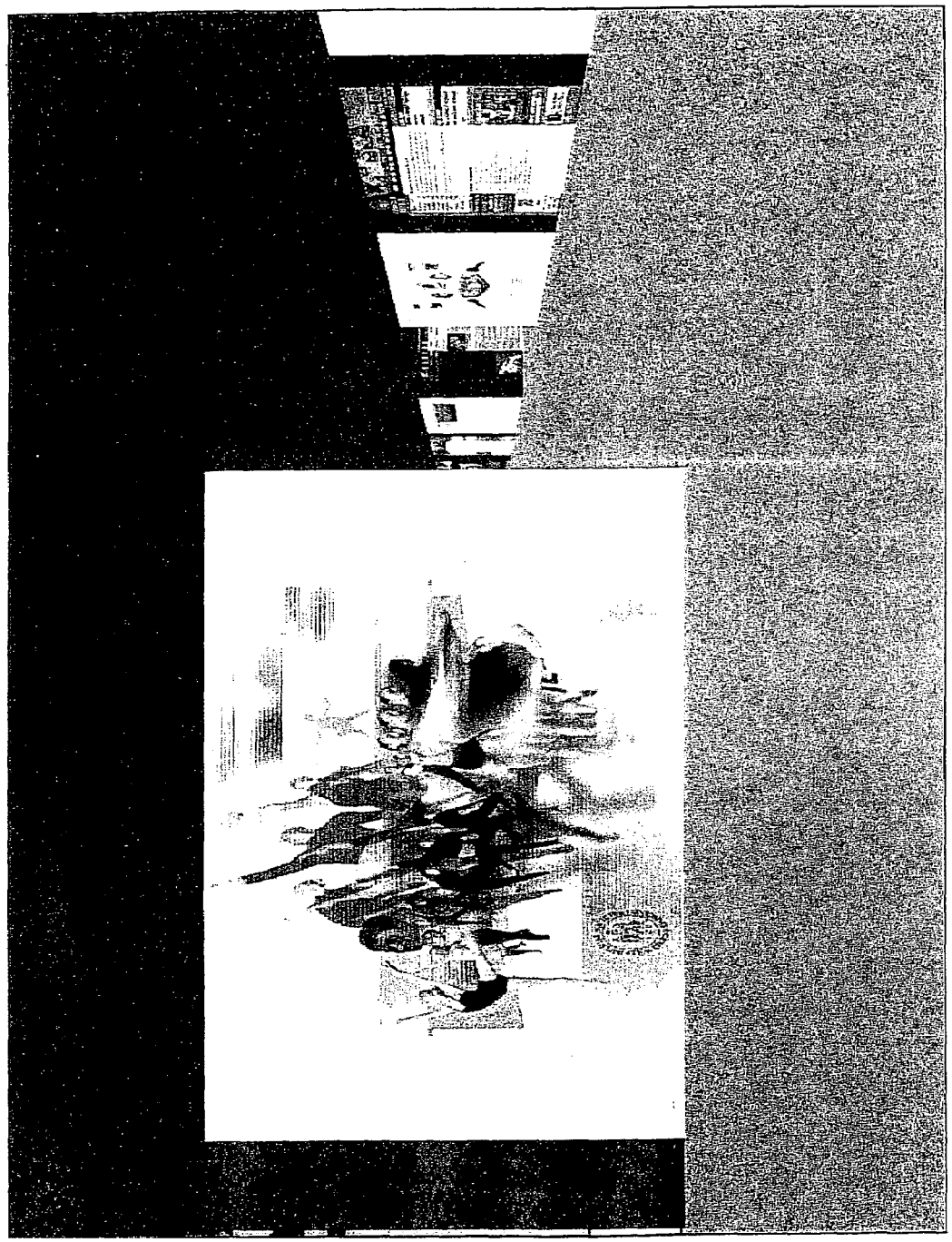
FIG. 4 is a diagram of a screen display generated by one embodiment of an information display method.

FIG. 3 and FIG. 4 show alternative views of the three-dimensional space. For example, in FIG. 3 the viewer is at a "corner" of a "street" with a "side street" running off to the left. In FIG. 4 the viewer is facing a display window and could potentially interact with the window in the manner of a conventional two-dimensional browser.

In another embodiment, a virtual city comprises one or more virtual multi-storey buildings. Each storey of the multi-storey buildings comprises one or more virtual display windows. Such an embodiment provides a larger number of available virtual display windows than an embodiment in which all virtual display windows form part of one-storey buildings.

2.2 Structural Overview; City Server Architecture

Figure 5A:
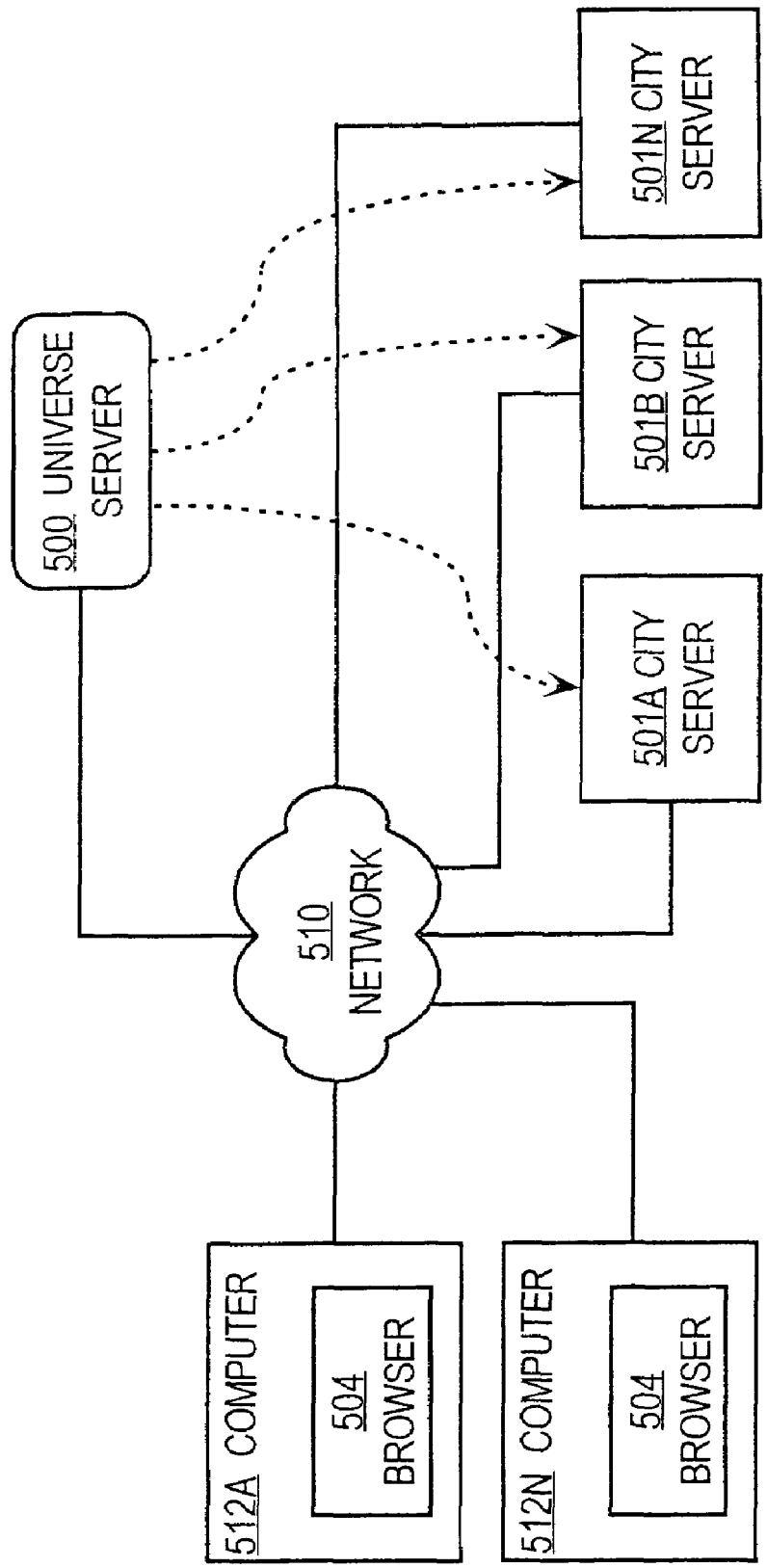
FIG. 5A is a block diagram of a city server system.

FIG. 5A is a block diagram of a city server system that may be used to implement an embodiment. One or more computers 512A, 512N hosting respective copies of a browser 504 are communicatively coupled to a network 510. One or more city servers 501A, 501B, 501N are communicatively coupled to network 510. A universe server 500 is also coupled to network 510 and supervises or manages the city servers 501A, 501B, 501N. For purposes of illustrating a simple example, two computers 512A, 512N and three city servers 501A, 501B, 501N are shown; however, an implementation may include any number of such elements.

Computers 512A, 512N may comprise any type of personal computer, workstation, or other end user station that can execute a browser. Browser 504 comprises a three-dimensional virtual space browser of the type described further herein. Network 510 comprises one or more local area networks, wide area networks, internetworks, or a combination thereof consisting of any number of direct or indirect links of any form, including wired metal or optical links, or wireless radio-frequency links, etc.

Each city server 501A, 501B, 501N comprises a computer system that can host and deliver applications that enroll tenants for display of content in virtual windows of a virtual city, and that can host and deliver a virtual city browsing experience to a user of the computers 512A, 512N. In an embodiment, a particular city server 501A can host and deliver one or more virtual cities to clients such as browsers 504.

Universe server 500 comprises a computer system that hosts a database identifying all city servers 501A, 501B, 501N and that can interact with computers 512A, 512N to enable selection of a particular city server for a browsing session. Universe server 500 may be implemented as a process attached to a database. One or more processes in the universe server 500 enable a list of virtual cities to be available to all city servers 501A, 501B, 501N and browsers 504.

Further, by managing the virtual city list, universe server 500 may selectively cut off access to particular virtual cities for a specified time period or permanently. Thus, universe server 500 acts as an authoritative directory for all city servers 501A, 501B, 501N. Universe server 500 also may manage and deliver template representations 528 for cities to enable users to create user cities, as described further below. In another embodiment, the template representations of cities are located in city servers rather than the universe server.

In one embodiment, universe server 500 communicates with city servers 501A, 501B, 501N using a secure streaming protocol. The streaming protocol provides a computer system and programming language neutral compact binary format to permit communication between the different components of the system. City servers 501A, 501B, 501N communicate with browser 504 using a data definition of a virtual city. In one embodiment, an XML stream or file represents a virtual city and is delivered on demand from city servers 501A, 501B, 501N to browser 504.

Figure 5B:
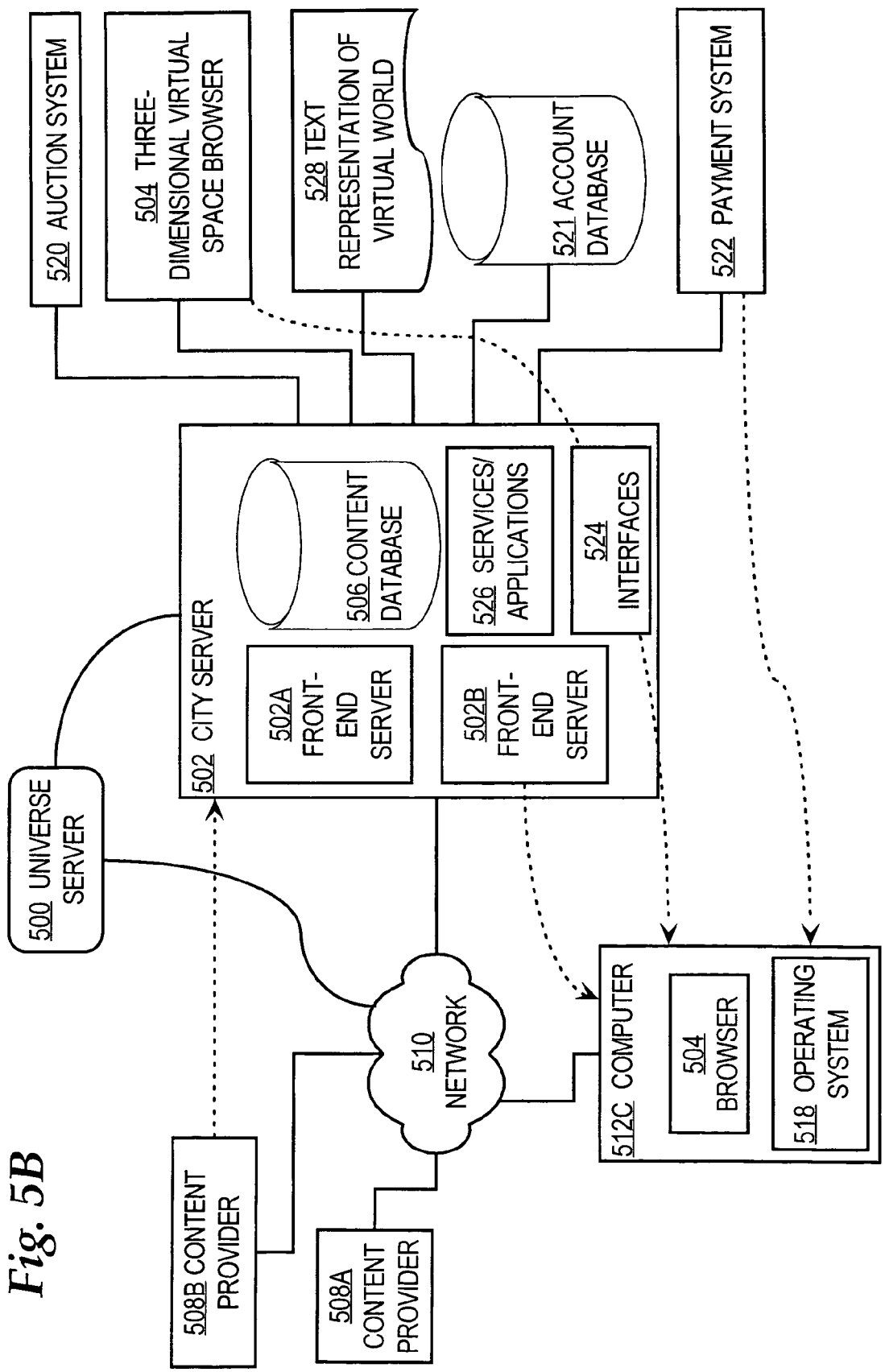
FIG. 5B is a block diagram illustrating further architectural elements of the system of FIG. 5A.

FIG. 5B is a block diagram illustrating further architectural elements of the system of FIG. 5A. As seen in FIG. 5B, a city server 502 comprises one or more front-end servers 502A, 502B, a content database 506, one or more services or applications 526, and one or more interfaces 524. City server 502 also hosts, is linked to, or can access an auction system 520, one or more copies of a three-dimensional virtual space browser 504, a data definition of a virtual world 528, an account database 521, and a payment system 522. Further, one or more content providers 508A, 508B are communicatively coupled to network 510.

In one embodiment, city server 502 hosts a master copy of browser 504 and can deliver copies to requesting clients upon demand. In an alternative embodiment, a third party hosts the master copy and delivers copies to clients upon demand or in response to instructions from the city server. Thus, the location in the system of a master copy of browser 504 is not critical, provided that client computers can access a copy in some manner upon demand. Clients that receive copies of the browser 504 install the browser and execute it in the client machine.

The one or more front-end servers 502A, 502B interact in a server-client relationship with computers 512A, 512B, 512C that are browsing or viewing a virtual city or virtual world that is offered by the city server 502. For example, front-end servers 502A, 502B are responsible for receiving requests from computers 512A, 512B, 512C and delivering copies of the data definition 528 to the requesting computers. Front-end servers 502A, 502B also may include a statistics module configured to request and receive statistical information or navigation information from browser 504 at any of the computers 512A, 512B, 512C. The statistics module is also configured for processing the statistical or navigation information, and providing aggregated or summary information to other elements of the city server 502. In an alternative embodiment the statistics processor is separate to the front-end servers 502A, 502B.

In one embodiment, front-end servers 502A, 502B communicate with other elements of a city server 502 using a secure streaming protocol identified above.

The data definition 528 describes a virtual world or virtual city as defined by an owner or operator of city server 502. In one embodiment, data definition 528 comprises one or more XML files that describe a virtual city. An example of an XML representation of a virtual city is provided herein in Appendix 1. In this example, the XML files provide functions as follows.

Content database 506 stores information about one or more content providers that provide information content for display at the computers 512A, 512B, 512C within display windows of a virtual city hosted by the city server 502. Content providers 508A, 508B may comprise any parties that may potentially display advertisements or information content in virtual display windows of a virtual city defined by the city server 502, such as Web sites, advertisers, or other online service providers, merchants, etc. Thus, the content database 506 indicates which content provider is currently responsible for delivering content when a particular computer 512C navigates to a particular window in the virtual city or virtual world. This would include the location of the content and the identity of the display window to which the content is cross-referenced.

The services or applications 526 comprise one or more computer programs or other software elements that implement services provided by the city server 502. Examples of services include enrolling content tenants, negotiating renewals of leases for virtual display windows with content tenants, administrative services relating to tenant accounts, administrative tools for defining a layout of the virtual city hosted by the city server 502, etc.

Interfaces 524 may comprise a graphical user interface or an electronic interface accessible to processes or machines, such as an application programming interface (API). For example, city server 502 may provide a GUI for administrative use, a Web GUI interface for use by tenants holding accounts associated with the virtual city, an API for updating content information, etc. In one embodiment, interfaces 524 provide methods for users or processes to access services and applications 526 for the purpose of performing the processes described herein with respect to FIG. 6A, FIG. 6B, FIG. 7, FIG. 8, FIG. 9.

Using auction system 520, city server 502 can auction rights to display content at one or more virtual display windows in the virtual city associated with the city server, according to processes described further herein. For example, to initially transfer display rights to a tenant, or to transfer display rights at the time that a tenant fails to renew a prior right, city server 502 can auction display rights to the highest bidder using an online auction system.

Account database 521 stores information about tenants of a virtual city and status of payment for virtual display rights. The account database may store account information, contact information, etc, about such content providers or tenants. Payment system 522 receives and processes payments for display rights.

In one embodiment, each city server 502 is owned or operated by a party in the business of offering virtual display windows for lease in exchange for consideration in the nature of rental fees. In an alternative embodiment, the ownership or operation of different aspects of the city server could be separated. The City Server could be represented by several computer servers. For example, all of the services relating to the City Server with the exception of the Front End Servers could be hosted by the same party that hosts the Universe Server. In this embodiment the one or more Front End Servers could be operated by the service provider that operates the city or cities.

In an alternative embodiment, a user city server is owned or operated by a service provider who allows end users to create their own virtual cities that are hosted and delivered by the service provider. Such a user city server also may be owned or operated by any other party. Such user cities may be restricted to being smaller than commercial virtual cities in terms of the number of virtual display windows. In this embodiment, the user city server delivers the user cities in the same manner as commercial virtual cities.

In another embodiment, the universe server or the user city server provides one or more baseline virtual city templates that may be used by users to develop particular virtual cities. A template representation of a user city may include one or more values not found in a normal virtual city. For example, a user city template representation may contain additional instructions that indicate how the city template can be extended. In this embodiment, user cities as represented by text in an XML file, could potentially be hosted on any web server, much like a web page, without any of the other functionality of the City Server. Such user cities would also not allow for any detailed statistical tracking of movements within the user cities.

Thus, either of the above embodiments allow end users to create user cities.

2.3 Establishing City Content; Browsing City Content

Figure 6A:
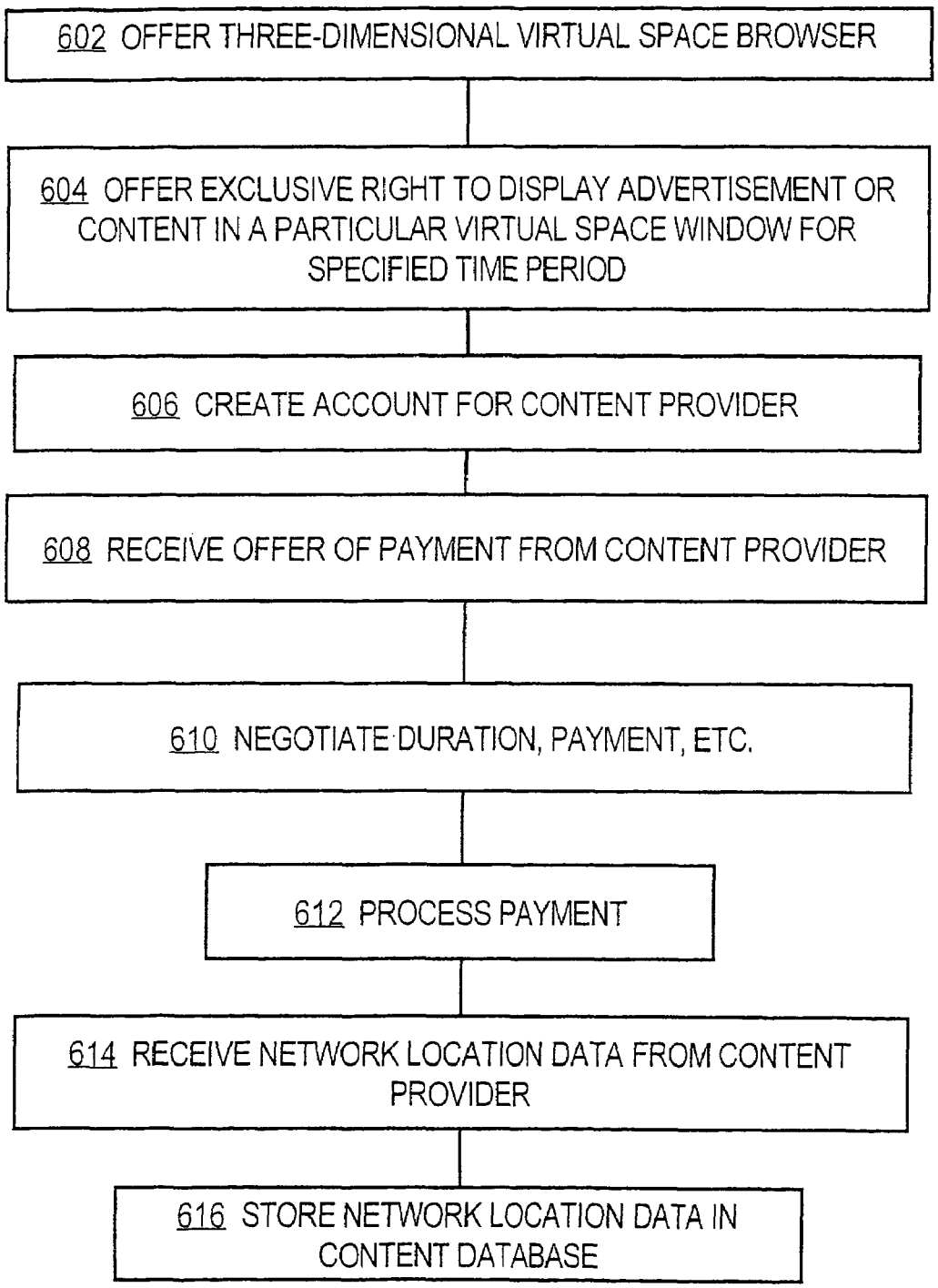
FIG. 6A is a flow diagram of a process of establishing a city server.

FIG. 6A is a flow diagram of a process of establishing a city server. In one embodiment, the process of FIG. 6A is implemented as part of services and applications 526 in a city server 502.

At step 602, a three-dimensional virtual space browser is offered. For example, as step 602, city server 502 hosts an HTML document that contains links for downloading copies of virtual space browser 504. At step 604, the exclusive right to display an advertisement or other content in a particular virtual space window for a specified time period is offered. For example, city server 502 may provide one or more HTML documents that specify display window locations in a virtual city and provide an offer to lease a display right for such locations for a specified fee or rent amount.

At step 606, an account is created for a content provider. Step 606 assumes that a content provider, such as an advertiser or an owner or operator of a Web site, has viewed the offers of step 604, selected a particular virtual space that the content provider wishes to lease, and indicated interest in leasing, for example, by selecting a link that notifies the city server 502 of such interest.

At step 608, an offer of payment is received from a content provider. For example, as part of providing a notification of interest in leasing a particular virtual space, content provider 508A may offer a particular fee or agree to pay a fee or rental amount that is advertised by the city server in connection with the selected space.

At step 610, the city server and content provider negotiate the duration of a virtual window display lease, payment amount, and other terms of a lease transaction as necessary. Step 610 may be performed through human interaction or through manual or automated exchange of electronic messages.

At step 612, a payment is processed. For example, city server 502 receives an HTML document representing payment information from the content provider 508A. After step 612, a city server virtual window lease transaction is complete.

At step 614, network location data is received from the content provider, and at step 616 the network location data is stored in a content database. In one embodiment, content provider 508A provides, to city server 502, a URL or other identifier for a Web page, image, file, or other information. In response, city server 502 stores the URL or other identifier in content database 506 in association with an identifier of the particular virtual window display location that has been leased by content provider 508A. Thereafter, the URL is delivered as part of data definition 528 when requested by computer 512C. As a result, when a user of computer 512C browses a virtual city represented by the data definition 528 using browser 504, the browser displays the content identified in the URL by content provider 508A when the user is viewing the virtual window that has been leased by the content provider. Further, this approach offers the benefit that the city server 502 does not host content, which may require significant mass storage. Instead, the content is hosted by the content provider 508A and merely referenced in the data definition 528 and in databases of the city server 502.

In one embodiment, a content provider may make changes to the URL by interacting with interfaces 524. For example, interfaces 524 may include a tenant access interface with which a tenant may specify an account name and password. Upon verification of the password, the tenant gains access to account information including HTML documents that display the URL or other network location identifier. Other information might include the display name of the display window and any category that the window might belong to. The tenant can enter updates to such information and submit an updated page to the city server.

Figure 6B:
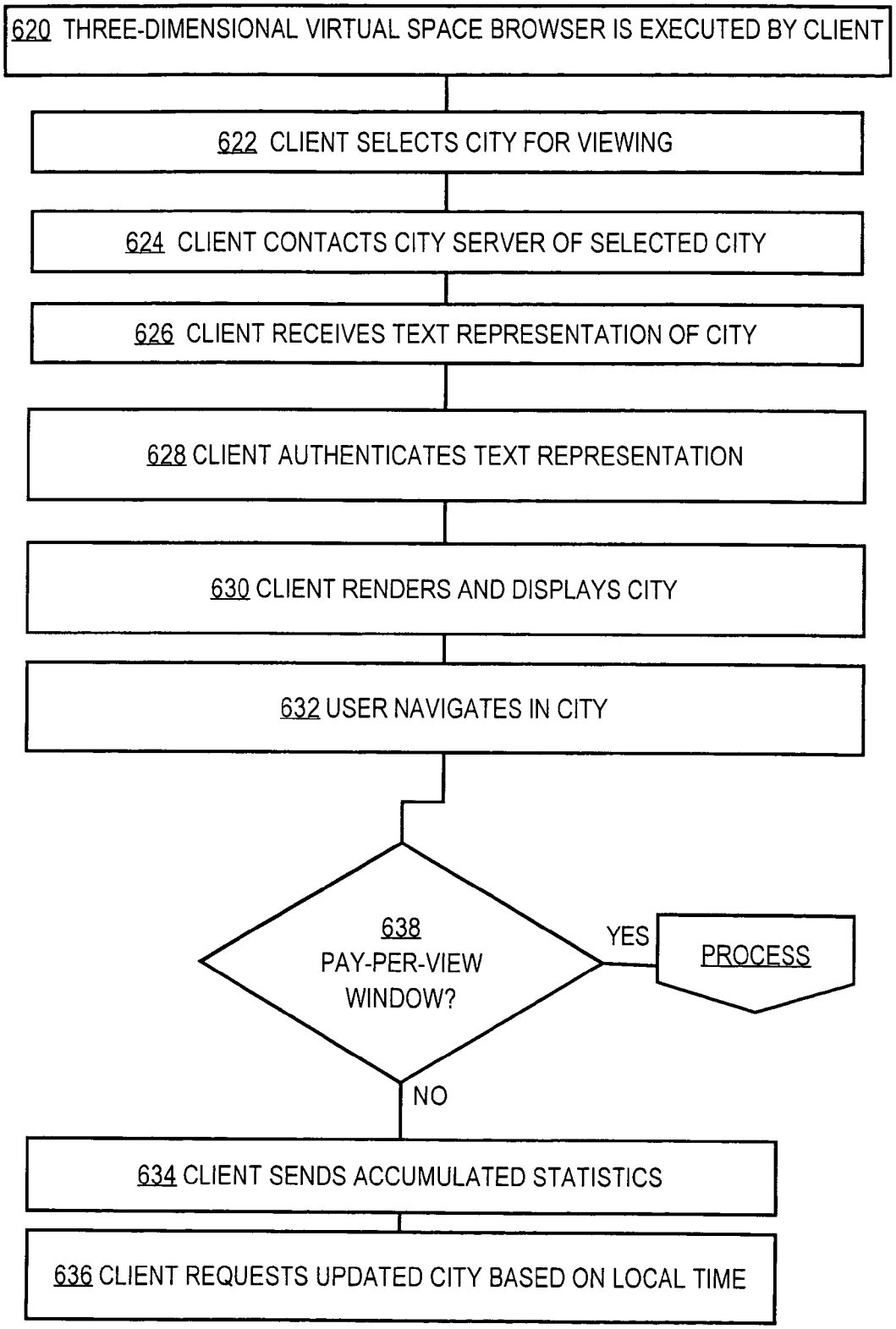
FIG. 6B is a flow diagram of a process of browsing a virtual city.

Illustrating the foregoing process in more detail, FIG. 6B is a flow diagram of a process of browsing a virtual city. At step 620, a three-dimensional virtual space browser is executed by a client. For example, computer 512C executes browser 504. In step 622, a client selects a city for viewing. In one embodiment, computer 512C connects to universe server 500 and receives a list of virtual cities that are then-currently managed by the universe server. The list may be delivered in an HTML document, and all information exchanged as part of the process of FIG. 6B may comprise HTML documents or XML documents or a continuous streaming format. A user of computer 512C then selects a particular virtual city, for example, by selecting a hyperlink or a user interface widget.

In step 624, the client contacts the Front End Server associated with the city server of the selected city. For example, selecting a particular city may result in the universe server redirecting the browser of the computer 512C to a particular city server 502. In step 626, the client receives a data definition of a virtual city. For example, when browser 504 of computer 512C contacts the Front End Server associated with the city server 502, the browser requests and the Front End Server for that city delivers a copy of data definition 528.

At step 628, the client authenticates the data definition. For example, browser 504 uses cryptographic techniques to validate a digital signature of city server 502 that has been applied to data definition 528. Using such authentication, the browser 504 can verify that the data definition 528 is genuine. As a result, malicious parties cannot substitute unauthorized content in a virtual city or otherwise manipulate the appearance or content of a virtual city.

Assuming authentication is successful, at step 630, the client renders and displays the virtual city, and in step 632 the user navigates within the virtual city to view information content displayed in one or more virtual display windows. In one embodiment, the three-dimensional virtual space browser 504 executed at computer 512C renders and displays a view of a virtual city based on parsing and interpreting the data definition 528. Typically an initial view that is rendered and displayed by browser 504 depicts only particular virtual windows of virtual buildings of the virtual city, as seen, for example, in FIG. 1, FIG. 2, FIG. 3, and FIG. 6C.

Figure 6C:
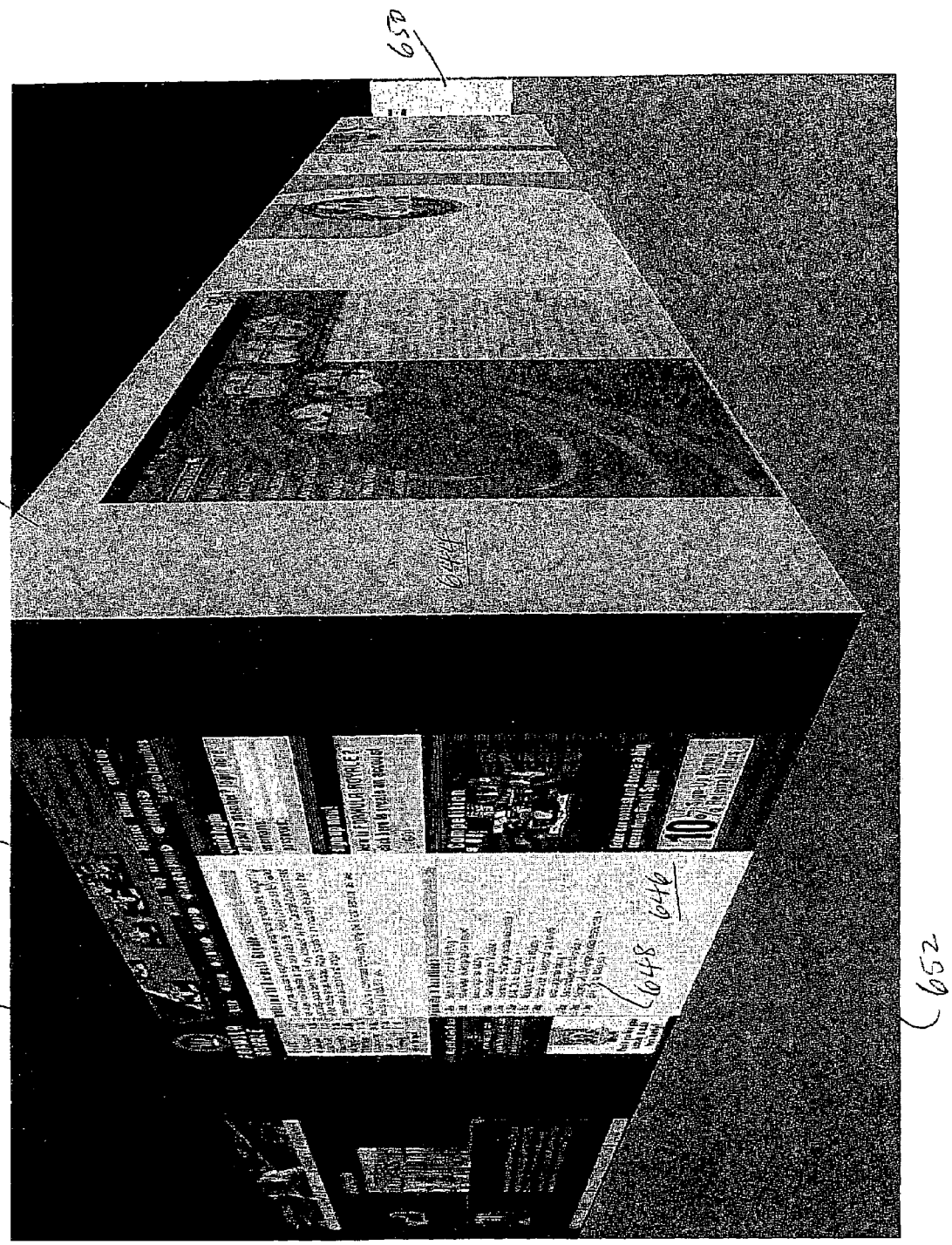
FIG. 6C is a diagram of a virtual city screen display generated by one embodiment of an information display method.

FIG. 6C is a diagram of a virtual city screen display generated by one embodiment of an information display method. Screen display 641 comprises one or more virtual buildings 642, 650 that include one or more virtual display windows 644, 646. Virtual buildings 642, 650 are depicted in virtual three-dimensional form and are delineated by virtual streets 652 and virtual sky 654. From a particular user viewpoint a first virtual building 642 may appear to be in a foreground or near position whereas a second virtual building 650 may appear to be in a background or far position.

In one embodiment, virtual display windows 644, 646 display textures rendered from HTML documents of online Web sites. Thus, the content of a particular virtual display window 646 appears the same as a corresponding Web site associated with a content provider that is the then-current tenant for the virtual display window. Further, a user may interact with a virtual display window as if the window is a Web page. For example, a user can navigate to a particular virtual display window 646, view and select hyperlinks 648. In an alternative embodiment the interaction might be partial, so that clicking anywhere on a particular display window may result in a user navigating to another web page, no matter where the click was positioned within the window. In yet another embodiment, the result of the interaction may cause the target Web site to open in a conventional two-dimensional web browser which forms another "view" within the virtual space browser. i.e. The content within the virtual space itself does not change as a result of the interaction, but the user switches to an alternate two-dimensional view of the web page. In an embodiment, a virtual city as displayed by browser 504 is rendered based upon a specified virtual city grid arrangement that is defined in the data definition 528. FIG. 6D is a diagram of a virtual city grid screen display generated by one embodiment of an information display method. In FIG. 6D, screen display 660 comprises one or more virtual buildings 642, 650 that include one or more virtual display windows 644, 646. Virtual buildings 642 are depicted in virtual three-dimensional form and are delineated by virtual streets 652.

Thus, unlike prior approaches, in the approach herein the virtual environment displays information content in the virtual display windows of virtual buildings. In contrast, in prior approaches a virtual environment has provided merely decorative textures that serve as a background for a game or other use of the virtual environment. In the present approach the information of the windows has inherent utility.

In step 638, a test is performed to determine if the user has navigated to a pay-per-view window. Step 638 is performed optionally in an embodiment that provides for regions of a virtual city that are protected by virtual gates and can be navigated only if the user satisfies particular criteria. Such criteria may include, for example, payment of a fee, the user having particular attributes such as a particular age, gender, security credential, etc. If the user selects a gate that provides entrance to a gated area, browser 504 generates and displays a pop-up window that prompts the user to enter a UserId and Password. If the user does not have a password, then the user is required to register and obtain a password, and the registration may involve making a payment. If the UserId and Password are found in the system database, then the user is permitted to navigate into the gated area.

In one embodiment, a three-dimensional virtual space browser maintains an internal log of all actions performed by a particular user at a client computer. In this embodiment, at step 634 the client sends accumulated statistical information to the Front End Server associated with the city server. Step 634 may be performed periodically by pushing such information, or a copy of the browser log, to a city server 502. Alternatively, the browser 504 may implement an API that can be called by the city server 502 to request the log or statistical information on demand.

Such statistical information or activity log information may be used to support a market for transfers or transactions in virtual property consisting of the virtual display windows described herein. For example, statistical or activity log information indicates which virtual display windows are visited by a particular user. When such information is aggregated for all users, it indicates the amount of navigation traffic that is received for each virtual display window. A city server may use such traffic information to determine prices for tenant leases of the right to display content in a particular region, block, building or window. For example, a high volume of traffic at a particular virtual display window means that visitors to that display window are also likely to navigate to adjacent virtual display windows that are within the user's field of view. As a result, a high volume of traffic at a particular virtual display window means that adjacent windows also are more valuable.

Separately from the statistical log, the browser may keep a history of the locations visited and the virtual spaces visited by the user, so that the user may retrace some of the movements made in the browser. This retracing may optionally be executed in the form of a tour. The browser may also have one or more predefined tours for each virtual space which may be specified in the data definition, thereby allowing the user to quickly become familiar with the virtual space which they are viewing. Furthermore the user may decide to mark some of the virtual spaces and locations visited in MyPlaces which is a list of the user's preferred virtual spaces and locations.

In step 636, the client requests an updated city based on a local time value. In one embodiment, the data definition is periodically updated by the city server in response to changes in tenancy for virtual display windows, or to reflect the addition or deletion of windows or buildings from the virtual city. In this embodiment, the data definition is received by the client at repeated intervals that occur periodically during a browsing session. For example, browser 504 may implement a polling timer such that the browser requests an updated version of data definition 528 upon expiration of the polling timer. An example duration of the polling timer is 10 minutes, but any other appropriate interval may be used.

If the browser 504 is navigating a user city, special processing may be applied different from the processing described above that is used for commercial cities. For example, processing a user city typically will not involve collecting complete statistics at the browser and communicating them to the city server, as described herein with respect to step 634 of FIG. 6B. In processing a user city, rather than following the process of step 634, browser 504 may provide the city server only with a value indicating a number of requests for the user city data definition or XML. This value may simply be extracted from the log of connections made.

In an embodiment of user city processing, the data definition 528 may be hosted at any server. The data definition 528 may be unencrypted and not signed. Instead, browser 504 may verify the authenticity of the data definition 528 simply by recognizing a template identifier within the data definition.

In one variation of this approach, the universe server maintains a blacklist of user cities that contain offensive or otherwise unacceptable content, based on a URL of a host server that serves the data definition of the user city. In this approach, as part of step 622, 624, or 626, browser 504 determines whether a selected user city appears in a blacklist maintained by the universe server. If so, appropriate responsive action is taken, such as displaying a specified page that contains a warning message, displaying a warning message in a message field of the browser user interface, etc.

2.4 Renewals, Auctions and Transfers of Virtual Property

Figure 7:
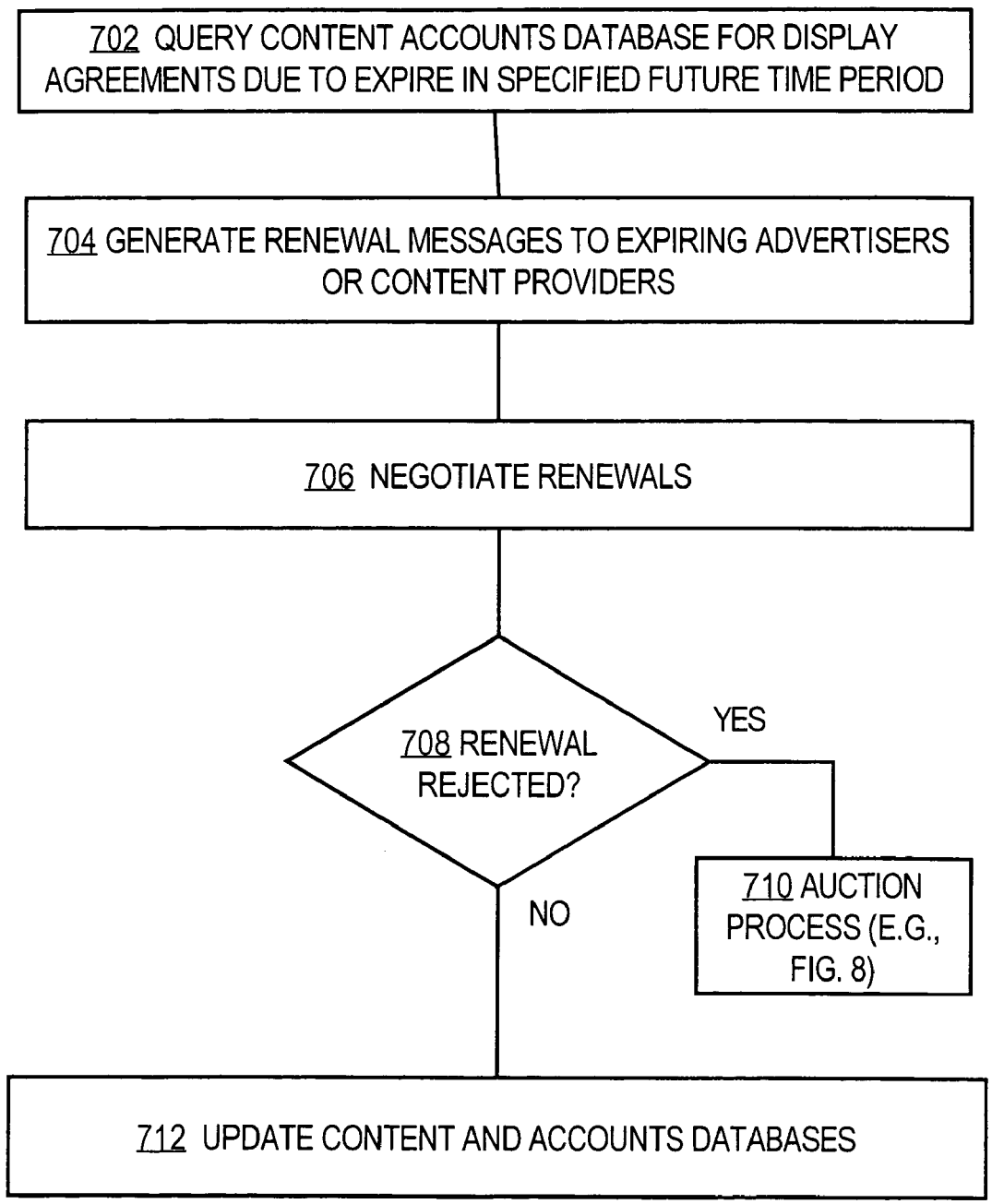
FIG. 7 is a flow diagram of a process of renewing a transaction associated with a display window in a virtual city.

FIG. 7 is a flow diagram of a process of renewing a transaction associated with a display window in a virtual city. In one embodiment, the process of FIG. 7 is implemented in as part of applications or services 526 of a city server 502.

In step 702, a content accounts database is queried to identify one or more display agreements that are due to expire in a specified future time period. Step 702 may comprise performing a scheduled job that automatically queries a database, or may comprise manually issuing a query. As a result, a result set of one or more display agreement records is generated. The records relate to leases of virtual display windows in the virtual city managed by the associated city server.

In step 704, one or more renewal messages to expiring advertisers or content providers are generated. For example, based on the result set generated in step 702, automatic e-mail messages are generated and sent to content providers who are tenants or lessees identified in the result set records.

In step 706, renewals are negotiated. Step 706 may involve the city server and content provider negotiating the duration of a virtual window display lease, payment amount, and other terms of a lease transaction as necessary. Step 706 may be performed through human interaction or through manual or automated exchange of electronic messages.

Such a negotiation may or may not result in agreement among the parties to the terms of a renewal lease for a particular virtual display window. Accordingly, in step 708, a test is performed to determine whether a renewal has been rejected by a content provider acting as a tenant or lessee of a particular virtual display window. If so, then rights to the virtual display window may be auctioned, as indicated in step 710. For example, the auction process of FIG. 8 may be used. If renewal is successful, then in step 712 the content database and accounts databases are updated with information identifying a new lease term and other information relating to the renewed lease transaction.

Figure 8:
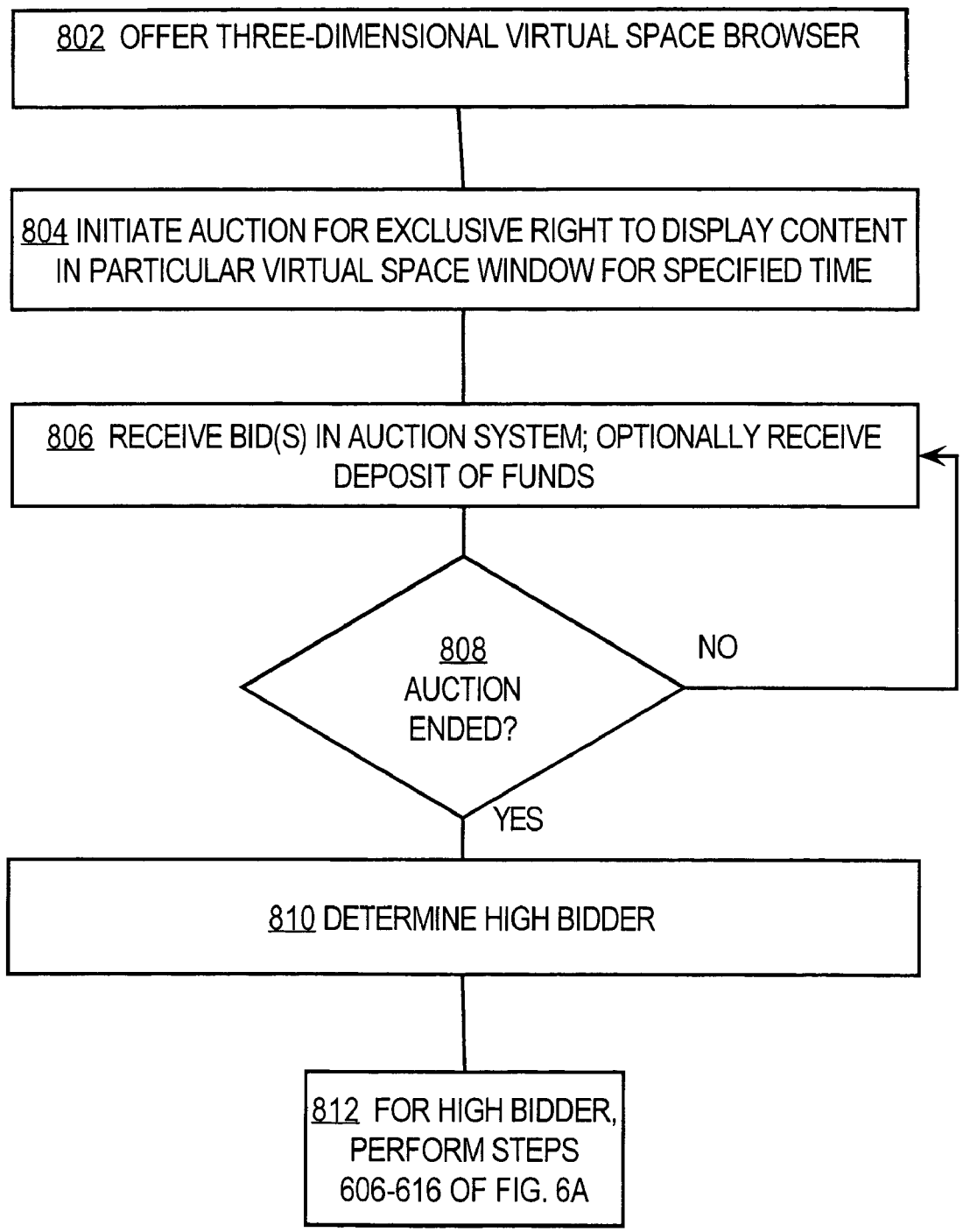
FIG. 8 is a flow diagram of a process of auctioning a right to display information in a display window of a virtual city.

FIG. 8 is a flow diagram of a process of auctioning a right to display information in a display window of a virtual city. In step 802, a three-dimensional virtual space browser may be offered and possibly an adapted data definition of the city which when rendered will provide information to potential bidders about virtual display windows on which they may place a bid. For example, as step 802, city server 502 hosts an HTML document that contains links for downloading copies of virtual space browser 504. In one embodiment, the process of FIG. 8 is implemented in as part of applications or services 526 of a city server 502.

At step 804, an auction is initiated for the exclusive right to display an advertisement or other content in a particular virtual display window for a specified time period. For example, city server 502 may provide one or more HTML documents that specify display window locations in a virtual city and provide an offer to auction a display right for such locations for a specified fee or rent amount. Alternatively, an external auction system 520 may be used to run auctions.

Such an online auction system may operate according to generally known principles in which a specified period of time is provided during which bidders may enter online bids for the offered rights. Bidders establish accounts with unique bidder identifier values, and enter into a binding agreement with the auction system 520 to complete a lease transaction for rights for which the bidders are successful. As shown in step 806, one or more bids are received in the auction system. The auction system optionally may require a deposit of funds as a surety or guaranty by which the bidder indicates a financial ability to complete a transaction.

At step 808, a test is performed to determine whether the auction has ended, and in step 810 a high bidder is determined. For example, upon expiration of the specified period of time, the auction system 520 automatically determines a winning bidder, notifies the winning bidder and an administrator of the city server 502, and provides instructions for completing a transaction. For example, as shown at step 812, the high bidder performs steps 606-616 of FIG. 6A to complete a transaction.

Figure 9:
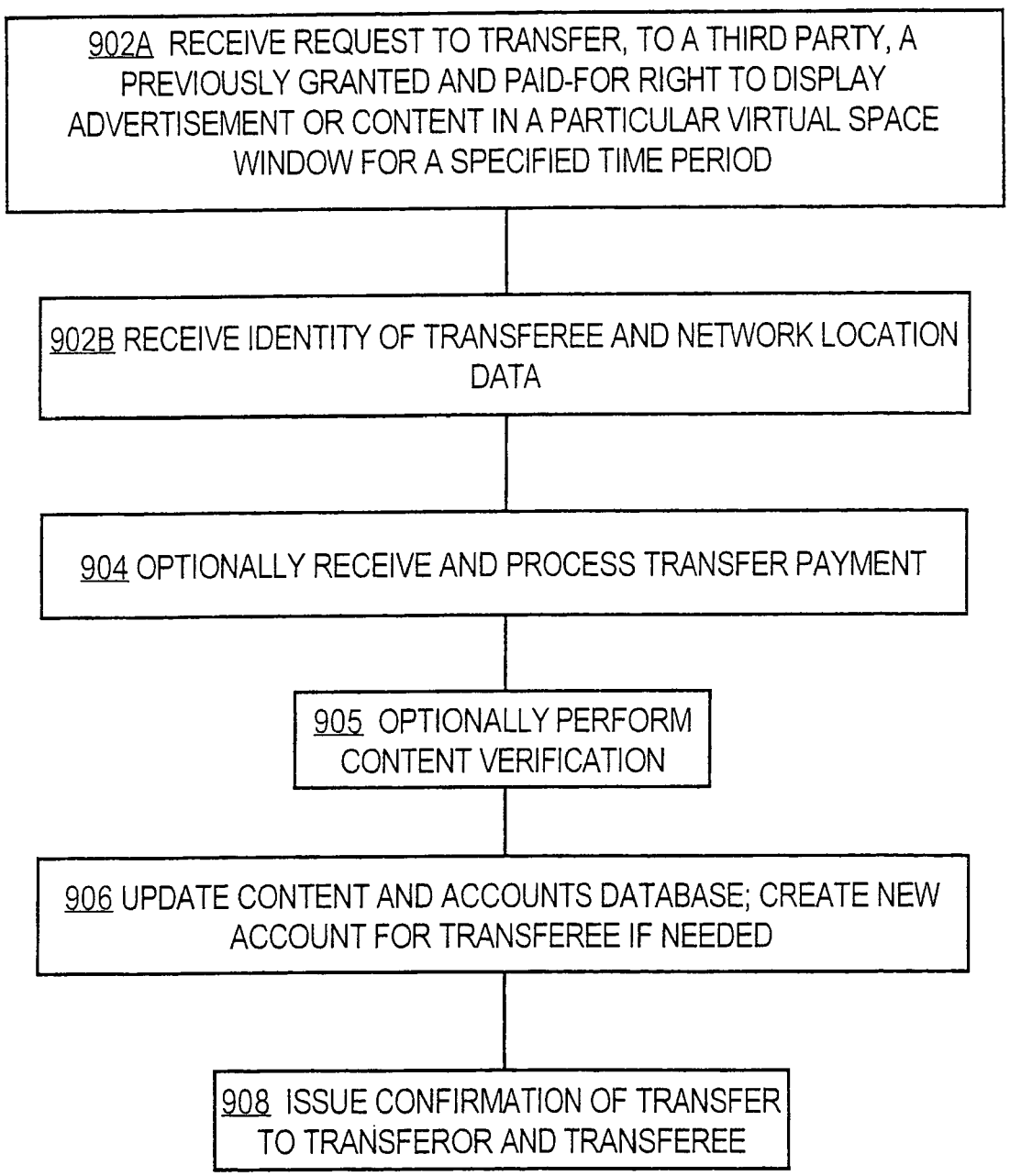
FIG. 9 is a flow diagram of a process of transferring a right to display information in a display window of a virtual city.

FIG. 9 is a flow diagram of a process of transferring a right to display information in a display window of a virtual city. In one embodiment, the process of FIG. 9 is implemented in as part of applications or services 526 of a city server 502. The process of FIG. 9 may be used as one part of a larger process of providing a market for virtual real estate in a virtual city managed by a city server.

In step 902A, a request is received to transfer, to a third party, a previously granted and paid-for right to display an advertisement or content in a particular virtual display window for a specified time period. For example, as step 902A, city server 502 hosts an HTML document that contains links for receiving an online form in which a tenant of a virtual display window may request the city server to transfer the tenant's window display rights to a third party. In step 902B, an identity of a transferee and network location data associated with the transferee are received. For example, the online form may include data entry fields or user interface widgets with which a tenant-transferor may specify a proposed transferee and a URL or other identifier of network content for future display in the tenant's particular virtual display window.

At step 904, a transfer payment is optionally received and processed. Thus, for example, city server 502 may optionally charge a fee for the service of transferring virtual display window rights from an existing tenant to a new tenant. If this option is implemented, then as part of step 904 the city server may require the transferor to provide a fee, which is processed using payment system 522.

In step 905, content verification is optionally performed. For example, city server 502 may accept only a particular kind of content for display by tenants in virtual display windows. Any standards may be applied by the city server at step 502. For example, one particular virtual city may restrict content only to information relating to a particular class of goods, a particular type of services, etc. Alternatively, step 905 may involve screening content of proposed transferees for acceptability to the users, etc. Step 905 may be performed through human interaction or via an automated process.

At step 906, content and accounts databases are updated, and a new account is created for a transferee if needed.

In step 908, a confirmation of the transfer is issued to the transferor and transferee. Step 908 may involve sending an automatic e-mail message, for example.

2.5 Three-Dimensional Virtual Space Browser Architecture

Figure 10:
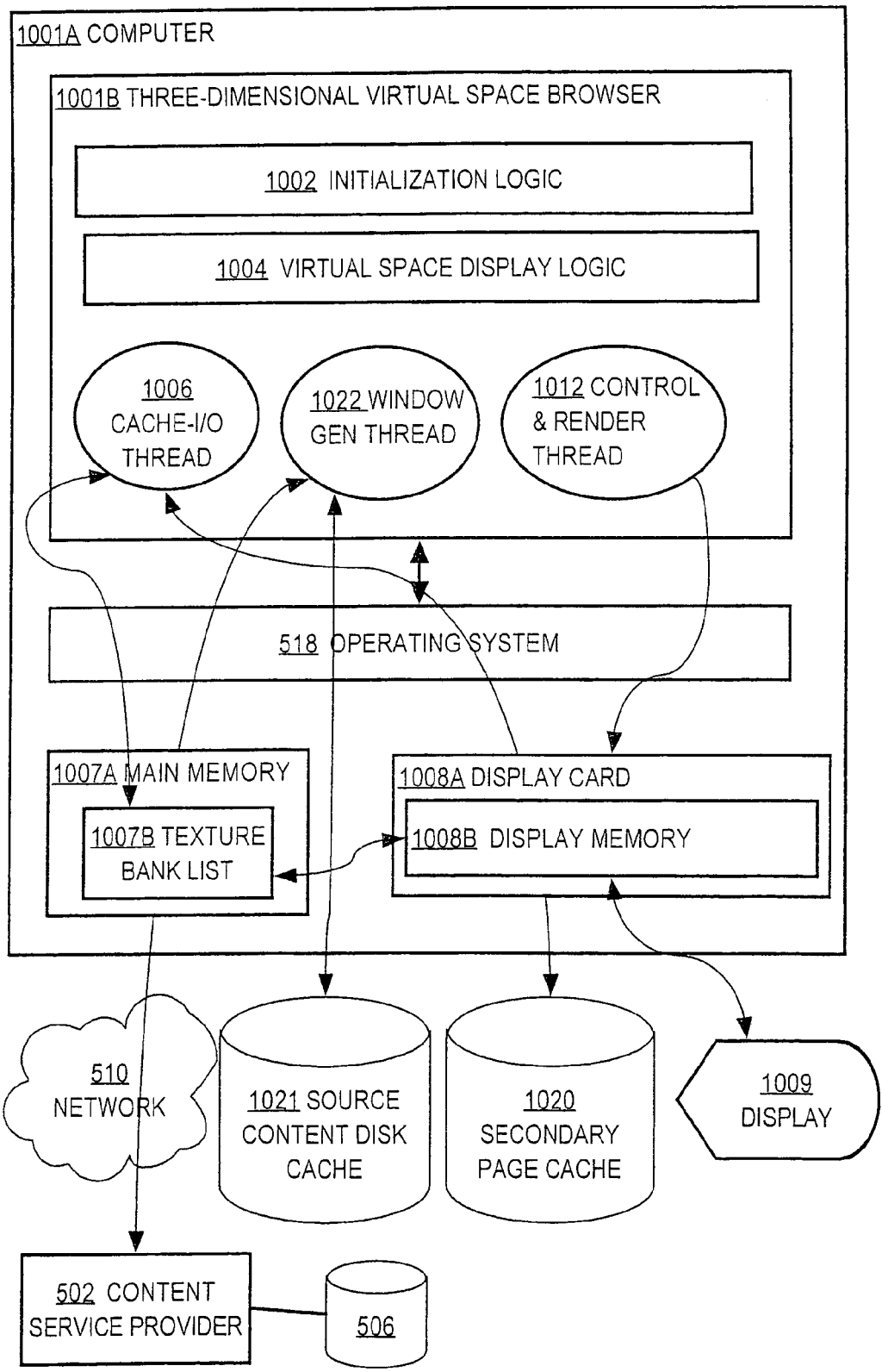
FIG. 10 is a block diagram of an example virtual space browsing system in which an embodiment may be used.

FIG. 10 is a block diagram of an example virtual space browsing system in which an embodiment may be used. A computer 1001A hosts a three-dimensional virtual space browser 1001B and an operating system 518. The computer 1001A also includes a main memory 1007A and a display card 1008A having display memory 1008B. Display card 1008A may be a separate card or integrated directly into computer 1001A. Display memory 1008B may be physically separate to main memory 1007A, or shared. Computer 1001A is communicatively coupled directly or indirectly through one or more networks 510 to a content service provider 502 that hosts stored content 506. In an embodiment, content service provider 502 comprises a city server of the type described in Gettman et al. Computer 1001A contains or can access a source content disk cache 1021 and secondary page cache 1020. Computer 1001A displays textures and other graphic images or subject matter on a display 1009. In one embodiment, computer 1001A comprises a personal computer based on the PCI bus, a workstation, a PDA, etc.

Three-dimensional virtual space browser 1001B comprises initialization logic 1002, virtual space display logic 1004, a cache-input/output (I/O) thread 1006, window generation thread 1022, and control/rendering thread 1012. Threads 1006, 1022, 1012 are spawned by virtual space display logic 1004 in cooperation with operating system 518 to perform the functions described herein.

In general, initialization logic 1002 interrogates display card 1008A, determines what graphic display functions are provided by the display card, and turns such functions on or off, including providing parameter values as needed. The foregoing capability of initialization logic 1002 is provided because various brands of graphics cards offer different types of display functions, thereby enabling three-dimensional virtual space browser 1001B to inter-operate with many different kinds of graphics cards. For example, display card 1008A may provide an anti-aliasing function for improving the appearance of graphical images that it displays. Initialization logic 1002 can detect the presence of an anti-aliasing function in display card 1008A and provide settings to enable the card to properly configure the function.

Further, in an embodiment, virtual space display logic 1004 interacts with display memory 1008B to display a relatively small number of high-resolution textures and a relatively large number of low-resolution textures. In this manner, display memory 1008B continuously stores high-resolution textures that are associated with virtual locations that are near a particular user viewpoint within a virtual three-dimensional space, which is a relatively small number of high-resolution textures, as well as all textures that appear in the distance with respect to the user viewpoint, which is a larger number of low-resolution textures. Techniques for maintaining the correct number of textures in display memory 1008B are described further herein.

In an embodiment, content 506 of a content service provider 502 comprises one or more HTML documents or Web pages. Computer 1001A can obtain an updated copy of content 506 at any time by communicating with content service provider 502 through network 510. Further, content 506 may be locally cached at computer 1001A using source content disk cache 1021. For example, source content disk cache 1021 can store all most recently used HTML documents or Web pages, or those documents or Web pages that are within a current field of view with respect to the user's then-current viewpoint of the virtual world, or that are likely to be viewed next by the user as indicated by the user's location within the virtual world.

Cache-I/O thread 1006 is responsible for loading content and paging content to the secondary page cache 1020. Window generation thread 1022 is responsible for retrieving content 506 from a content service provider 502 and generating a texture based on the content. The window generation thread 1022 is also responsible for saving updated content 506 to the source content disk cache 1021. Control & rendering thread 1012 is responsible for overall control of elements of the system and for rendering textures to the display card 1008A and its display memory 1008B in accordance with capabilities of the display card.

2.6 Graphical User Interface Implementation Example

Figure 12:
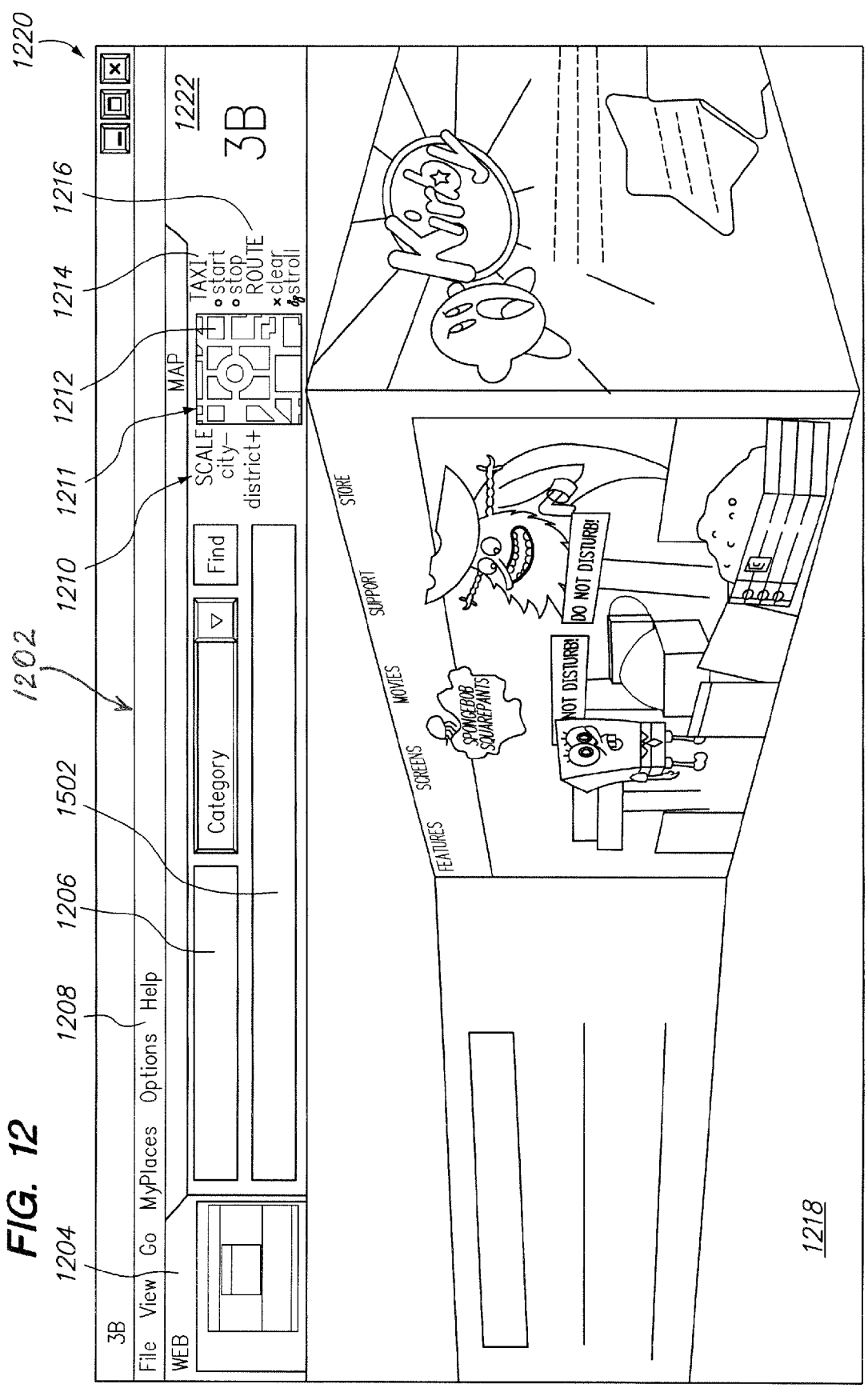
FIG. 12 is a screen display diagram showing a three-dimensional browser view.
Figure 13:
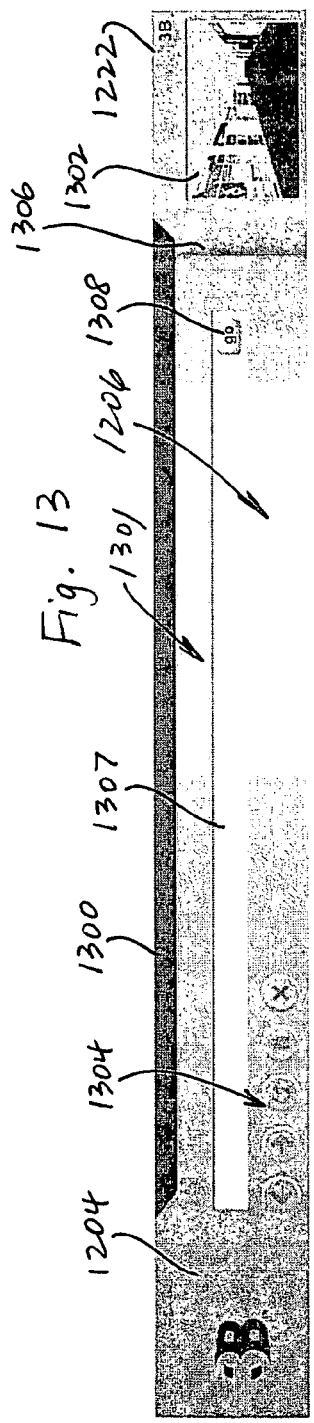
FIG. 13 is a screen display diagram showing a flat page view.
Figure 13:
Figure 14:
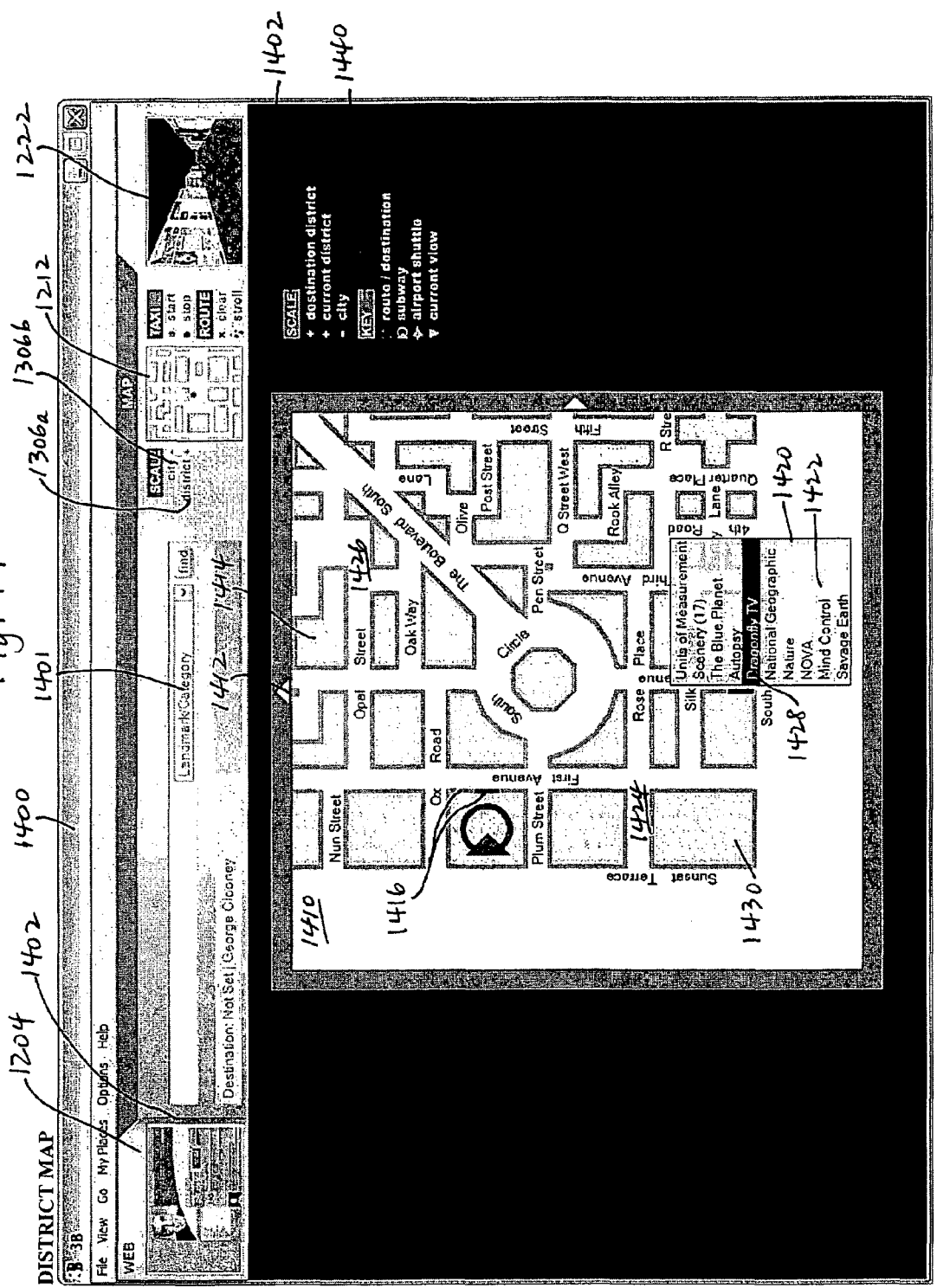
FIG. 14 is a screen display diagram showing a view of a district of a virtual city.
Figure 15A:
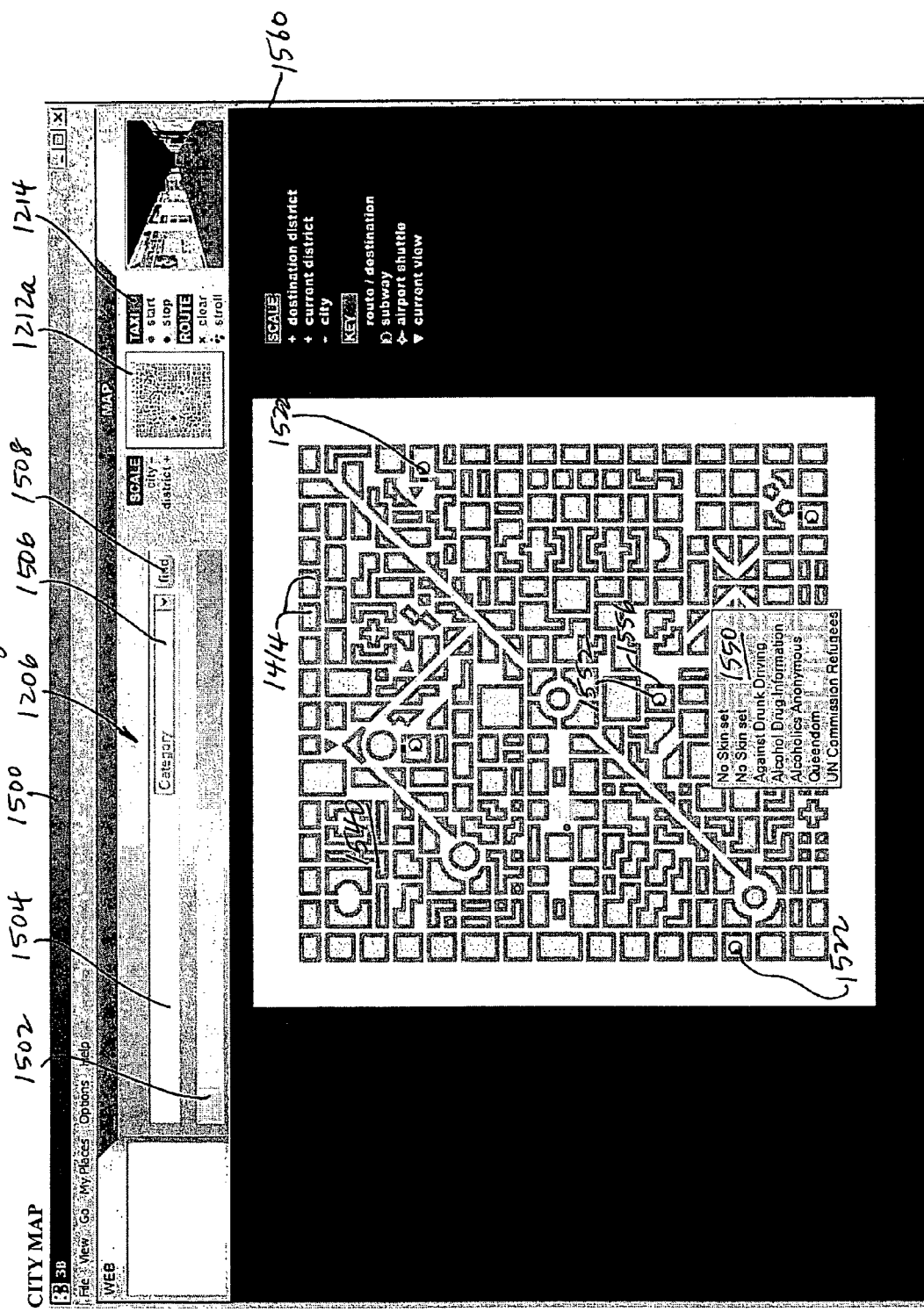
FIG. 15A is a screen display diagram showing a map view of a virtual city.

One example implementation of a user interface for a three-dimensional virtual space browser is now described with reference to FIG. 12, FIG. 13, FIG. 14, FIG. 15A, and FIG. 15B. FIG. 12 is a screen display diagram showing a three-dimensional browser view; FIG. 13 is a screen display diagram showing a flat page view; FIG. 14 is a screen display diagram showing a view of a district map of a virtual city; FIG. 15A is a screen display diagram showing a city map view of a virtual city; FIG. 15B is a diagram of the screen display of FIG. 15A with a route displayed.

Referring first to FIG. 12, a screen display comprises a main pane 1220 and a toolbar 1202. The toolbar 1202 comprises a web button or interactive content button area 1204, input interface area 1206, Menu1208, map interface area 1211 including a map selector 1210 and mini map 1212, taxi movement selector 1214, route selector 1216, status box 1502, and 3B button area 1222. A three-dimensional view 1218 of a virtual three-dimensional space is displayed in main pane 1220, and such a view is referred to herein as a "3B view." A user may navigate in the virtual three-dimensional space by selecting keyboard keys; in response, the browser re-displays main pane 1220 to show a different part of the virtual three-dimensional space. In one embodiment, the following key functions are defined: Up arrow—move forward while held down, stop when key released; Down arrow—move backwards while held down, stop when key released; Left arrow—turn left while key held down, stop when key released; Right arrow—turn right while key held down, stop when key released; Less than arrow—shuffle left while key held down, stop when key released; Greater than arrow—shuffle right while key held down, stop when key released; Space bar—move up to the window in the centre of the view, so that the viewer can see the full page, with a hint of any locations to the left and right ; Z key—shuffle left; X key—shuffle right. In alternate embodiments, any other suitable combination of keys and functions may be used and a mouse or other alternate navigation apparatus may be used.

In one embodiment, the browser can display several different forms of views and maps of a virtual three-dimensional space, such as a virtual city, and a user may select among the various views and maps using elements of the screen display. For example, web button area 1204 comprises one or more hyperlinks which, when selected by a user, causes the browser to display a view of a web page or other networked interactive content in main pane 1220, as best seen in screen display 1300 of FIG. 13, and such a view is referred to herein as a "web view." In another embodiment, the web button area could contain text only or an icon or symbol rather than a small image of a web page. Alternatively by clicking on web button area 1204 the three-dimensional space browser activates an inbuilt or external conventional web browser and passes the browser the appropriate hyperlink or web address to display in another application window. The web page in the web view corresponds to either the last web page that was loaded by a conventional two-dimensional browser that operates on the same client as the three-dimensional virtual space browser, or a default web page, or a page that is linked to a display window in the virtual three-dimensional space on which the user has clicked or viewed face on. If the main pane 1220 is already displaying the web view, as in FIG. 13, then selecting the web button area 1204 causes no action. Screen display 1300 may be generated by integrating a conventional Web browser, such as Mozilla, into a three-dimensional virtual space browser 504 using an appropriate change in user interface appearance or "skin." Alternatively the Web browser could be external to the three-dimensional space browser. In an alternative embodiment, instead of web content, the content could be other networked interactive content, for example accessible by a mobile phone, television set top box or games console. In yet another embodiment, the web view is integrated in to the three-dimensional perspective view so that users may interact with a web page or other interactive content directly within the three-dimensional perspective view.

Further, a mini map 1212 is provided in the screen display to assist the viewer in identifying the viewer's then-current position either within a small area (or district) of the virtual three-dimensional space, or the viewer's then-current position within the entire city. Input interface area 1206 comprises an input box 1207 that may receive a user-entered network location identifier for a virtual city or a search term. In one embodiment, input interface area 1206 may also include status box 1502. The status box displays messages, alerts or other information generated by the browser. 3B button area 1222 displays an image and tab which, when selected by a user, cause the browser to display the 3B view in the main pane 1220. If the main pane is already displaying the 3B view, as in FIG. 12, then selecting the 3B button area causes no action and the contents of the 3B button area may be different.

Referring again to FIG. 13, when the three-dimensional virtual space browser is displaying the web view or map view, the 3B button area 1222 displays a small three-dimensional perspective view 1302 of the virtual world. In one embodiment, the small view 1302 is displayed in 3D perspective with a view down a channel of the virtual world, and not as a thumbnail of the last image displayed within the 3B view. In one approach, a default 3B view of the then-current city is defined as a bitmap image for display in the small view 1302. For example, the default image may be the first 3D perspective view that a viewer sees down a street with a horizon, on exit of an airport associated with the virtual city. In a second approach, a proper 3D view is captured just before a user selects the web view. Alternative embodiments might purely have a text and/or icon in the 3B button area.

Referring again to FIG. 12, map interface area 1211 comprises a City scale button, and a District scale button. In an embodiment, selecting either the City scale button, or District scale button causes the mini map 1212 to display a different scale of map. In an embodiment, clicking on the mini map 1212 causes the browser to display a macro map in main pane 1220, as best seen in FIG. 15A. In an alternative embodiment the macro map may be displayed in another pane or another application window. In one embodiment, the mini map 1212 of map interface area 1211 comprises graphical elements identifying positions of a viewer, a path that the viewer can take through the virtual city to a selected destination, a destination of the viewer within the virtual city, and one or more gateways that may exist within the virtual city. It is also possible that it may display paths that have been previously followed by the viewer. Further, in one embodiment, the mini map 1212 is a selectable area which, when selected, causes the browser to display the map view in main pane 1220.

In another embodiment, a Map identifier in map interface area 1211 is a selectable area which, when selected, causes the browser to display a map view in main pane 1220. FIG. 14 shows a screen display with an example mini map 1212*a* at a District scale and a Macro Map 1410 at a District scale, and FIG. 15A shows a screen display with an example mini map 1212*a* at a City scale and Macro Map 1540 at City scale. In this context, City scale refers to a scale showing an entire virtual three-dimensional space or virtual city within the main pane 1220, and District scale refers to a scale showing only a region, portion, or district of a virtual three-dimensional space or virtual city within the main pane 1220 in enlarged form. If the browser is already displaying the map view, then selecting the Map identifier causes no action. In alternative embodiments, the precise sizing or positioning of the mini map could be varied and the mini map could be rotating rather than static as shown in FIG. 14 and 15A, and with a directional indicator which is useful for a rotating map. In yet another embodiment the scale of the mini map and macro map could be less or more than the two scales (city and district) indicated in the FIG. 14 and 15*a*. Furthermore, FIG. 14 shows the mini map and macro map in the same scale. An alternative embodiment would be that the mini map is at a different scale to the macro map.

In one embodiment, a Macro Map 1540 at City scale is displayed without street names and without indications of building heights or shadows. The map shows all gateways, but no other landmarks or advertisers. The map shows the user's position, and allows the user to mouse over buildings to see and select destinations in same way as in a District scale map view.

In one embodiment, selecting the City link in the map interface area 1210 causes the browser to re-display the mini map 1212 in a city scale. For example, FIG. 15A shows mini map 1212*a* displayed in city scale. Thus, selecting the City link does not change main pane 1220 in FIG. 12 from web view or 3B view to the map view; in an embodiment, only when the browser is operating within the map view, selecting the City link changes the scale of the macro map in the main pane 1220. If the browser is operating within the map view, then selecting the City link causes the browser to re-display both the mini map 1212 and the macro map in the main pane 1220 in the city scale. In an alternative embodiment, selecting any map related scale link could force the map view to be launched.

In another embodiment, selecting a District option using map selector 1210 causes the browser to change a scale of the mini map 1212 to a district scale. If the browser is then-currently display a map view, then selecting the District option using map selector 1210 causes the browser to re-display the map view at a district scale, as best seen in FIG. 14. In an alternative embodiment the map interface scale links could relate to the mini map alone and the scale links to the right of the macro map could relate to the macro map alone. In another alternative embodiment, instead of having city and district scale links there could be generic increase and decrease scale links, similar to a zoom.

In the map view, where the map only displays a subsection, such as a district, of the virtual three-dimensional space, a mechanism is provided in the map to view adjacent sections or districts in the map. In one embodiment this is in the form of providing clickable arrows at the edge of a district map. Additionally keyboard shortcuts may be provided, such as pressing the "up arrow" key to move to the Northerly district, "left arrow" key for the district to the West, "right arrow" key for the district to the East, and "down arrow" key for the district to the South.

Referring again to FIG. 12, the taxi movement selector 1214 comprises, in one embodiment, a Go link and a Stop link. Selecting the Go link causes the browser to change to 3B view and to rapidly move a virtual position of the user on a path that has been previously highlighted in the map view, representing a virtual taxi journey on the indicated path. The path is also highlighted on the virtual road in the virtual three-dimensional space. If no destination is highlighted in the map view of the main pane 1220, then the browser displays an error message in the status bar 1502. For example, the browser displays the message: "Choose a destination on the map". Selecting the Stop button, which is allowed only within the 3B view, causes the browser to stop the virtual taxi journey at the then-current location. This enables a user to stop and view material content of virtual display windows at the then-current location. The taxi route remains highlighted in the mini map 1212. In an embodiment, a key of a client computer keyboard may be selected to provide the same function as the Stop button, thereby providing a keyboard shortcut for the Stop function.

In various embodiments, taxi destinations are selected from the Map view. Once a destination has been selected, the user can start a taxi journey from the Map view or 3B view. A taxi journey can be stopped and resumed at any point during the journey. In one embodiment, specifying a destination is performed in the Map View, by moving a cursor over a destination building and selecting a destination display window as it is highlighted. Alternatively, a user can select the destination display window name as it is highlighted in the pop-up list. In response, a route of the journey is displayed in the Map View. Further, a destination district map can be viewed by clicking on the button to the right of the map.

The browser then displays a "Take a taxi? Start" button. Selecting the button starts the virtual taxi journey. The "Take a taxi? Start" button which appears near the selected destination, disappears after a short time interval. Alternatively, a user may select a Start label in the Taxi option on the toolbar to the right of the mini map. The display of the main pane switches to the 3B View and the taxi journey is performed. Stopping a journey may be performed using the keyboard by selecting the space bar button while in the taxi. Alternatively, a journey is stopped using the toolbar by moving the mouse cursor to the toolbar, selecting a Taxi option of the toolbar, and selecting the Stop label. Upon stopping, the user may navigate in the virtual world within the 3B view. The taxi journey may be resumed by moving the mouse cursor to the toolbar, selecting the Taxi option in the toolbar to the right of the mini map, and selecting the Start label.

In an embodiment, route selector 1216 comprises a Clear link and a Stroll link. The Clear link is only actionable from the map view, and functions to clear any displayed route off the Macro Map and mini map. A particular destination point in the Macro Map of the map view is selected as described in the taxi destination selection. In response, the browser displays a route from the user's then-current virtual location to the destination point that has been selected. Selecting the Clear link removes the route from the map view. Selecting the Stroll link causes the browser to change to the 3B view with the user at the starting point of the displayed route, and the route highlighted on the virtual road within the virtual three-dimensional space.

Functions accessible through menu 1208 may vary depending on which view the browser is showing. In an embodiment, each word shown in menu 1208 of FIG. 12 is a selectable link or button which, when selected, provides a drop-down menu of function options. In one embodiment, menu 1208 provides File, View, Go, My Places, Options, and Help menus, which provide the following functions.

The File menu provides an Open function that triggers a user interface dialogue to enter a City URL or open a file from a local or networked location. A Save Screenshot function triggers a dialogue to receive a name of a file in which to save a bitmap of the lower screen display area and a logo overlay element. An Exit function terminates operation of the browser.

The View menu provides a 3B view function that changes the browser display to a three-dimensional virtual space view. A Web view sub-menu changes the browser display to a two-dimensional browser view using one of two options. A Last viewed function opens a last viewed Web page; this function is grayed out if no such page has been opened. A Straight ahead function determines whether a web page is provided in a virtual display window that is then currently within the three-dimensional viewpoint of the viewer, and if so, the window is displayed in a two-dimensional browser view. This function is grayed out if no window is within focus with respect to the viewer's view.

A Map view sub-menu of the View menu provides City, Current District, and Destination District functions. The City function switches the display to the city map view. The Current District function switches the display to the district view of the current district. The Destination District function switches the display to the district view of destination point; this function is grayed out if no destination exists or has been selected.

A Subway map function of the View menu switches the browser display to a subway map view that indicates the position and/or paths of subways in the virtual city. The function is grayed out if the city contains no subways. In one embodiment, a subway map view is identical to the map view of FIG. 15A, but the virtual buildings are displayed in light gray and only the subway station locations 1522 are highlighted. Use of the subway is described further below with respect to FIG. 17.

Referring again to menu 1208 of FIG. 12, a Refresh city function causes the browser to move the user's virtual position back to a specified arrival point within the virtual city. A Refresh window function restarts a display rendering function with respect to a virtual display window that is then currently in focus to the viewer; this function is grayed-out if no such window is in focus or if the window is already in the process of refreshing.

A Go menu provides a Move function that causes the virtual position of the user to move, and may have Forward, Backup, Left turn, Right turn, Shuffle left, Shuffle right, and Full page view sub-functions. A Take a tour function causes the browser to automatically move a virtual position of the user according to a path specified by a default tour that is defined in the data definition of the virtual city; this function is grayed-out if no such tour is defined in the city. An Entry portal or main gateway function causes the browser to initiate a virtual taxi ride that moves the viewer to an arrival quad. A Nearest subway function causes the browser to initiate a virtual taxi ride that moves the viewer to the nearest subway station; the function is grayed-out if no subways are defined in the virtual city. A Starting city function causes the browser to change the display to show a default virtual city; the function is grayed-out if the viewer is then currently viewing the Starting city.

A My Places menu is provided as a means of organizing stored virtual cities as well as locations within virtual cities. In one embodiment, when the two-dimensional web browser view is displayed, the My Places menu is replaced with a conventional Bookmarks or Favorites menu. In the My Places menu, an Add MyPlace function causes the browser to add the current virtual city to the end of an appropriate menu. If there are only a limited number of approved cities, these will automatically appear in the list of MyPlaces. The MyPlaces functionality provides for three types of cities. Approved cities appear in the main list. Villages or user created cities which have been added by the viewer all appear in a Villages sub-menu within MyPlaces. If adult password protection has been enabled an Adult submenu will also appear. Other functions may be provided to allow reordering, deleting and organizing added cities, villages, and adult-oriented cities and of locations within these.

Figure 18A:
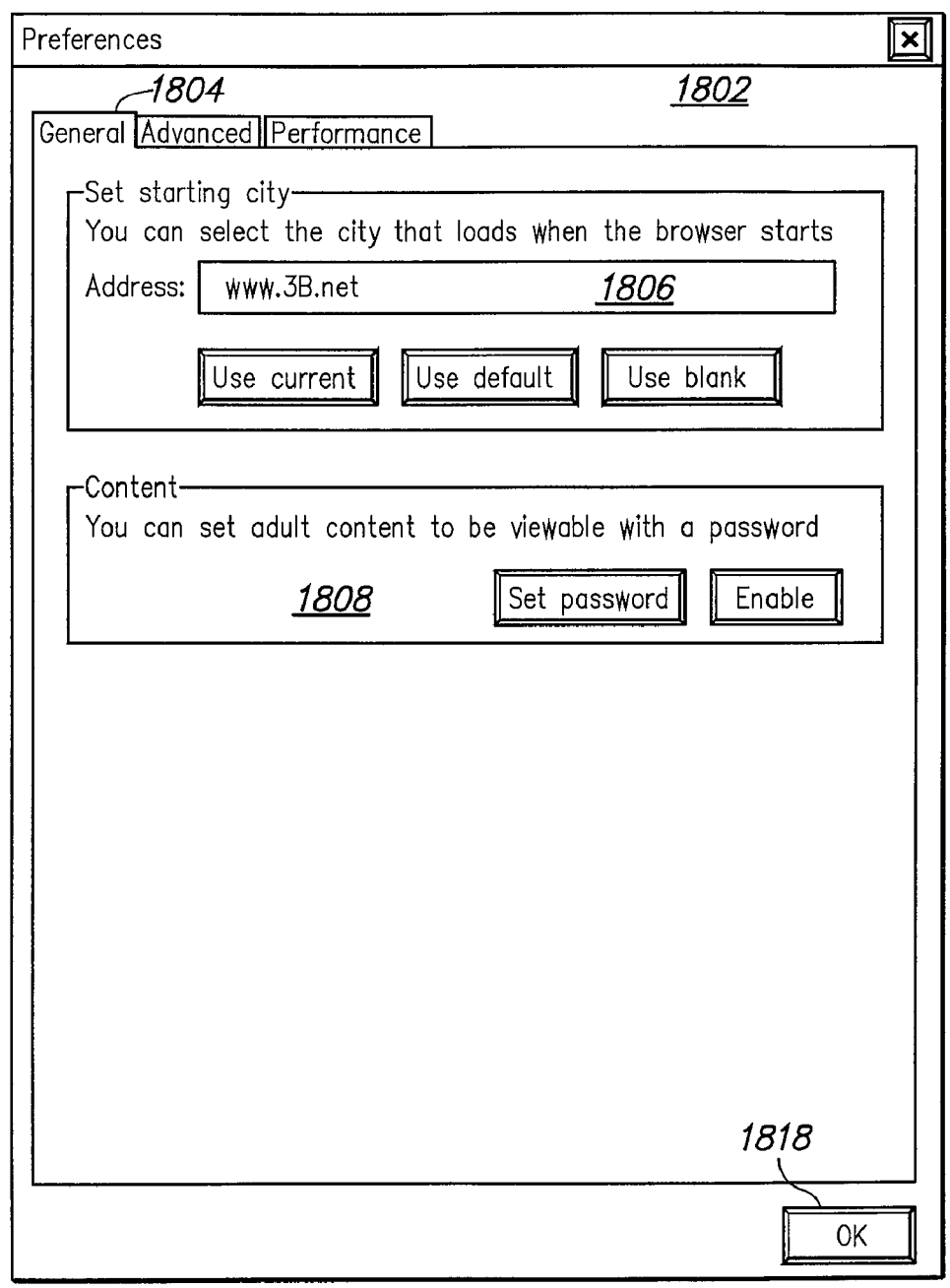
FIG. 18A is a diagram of a user interface preferences panel showing a General tab.
Figure 18B:
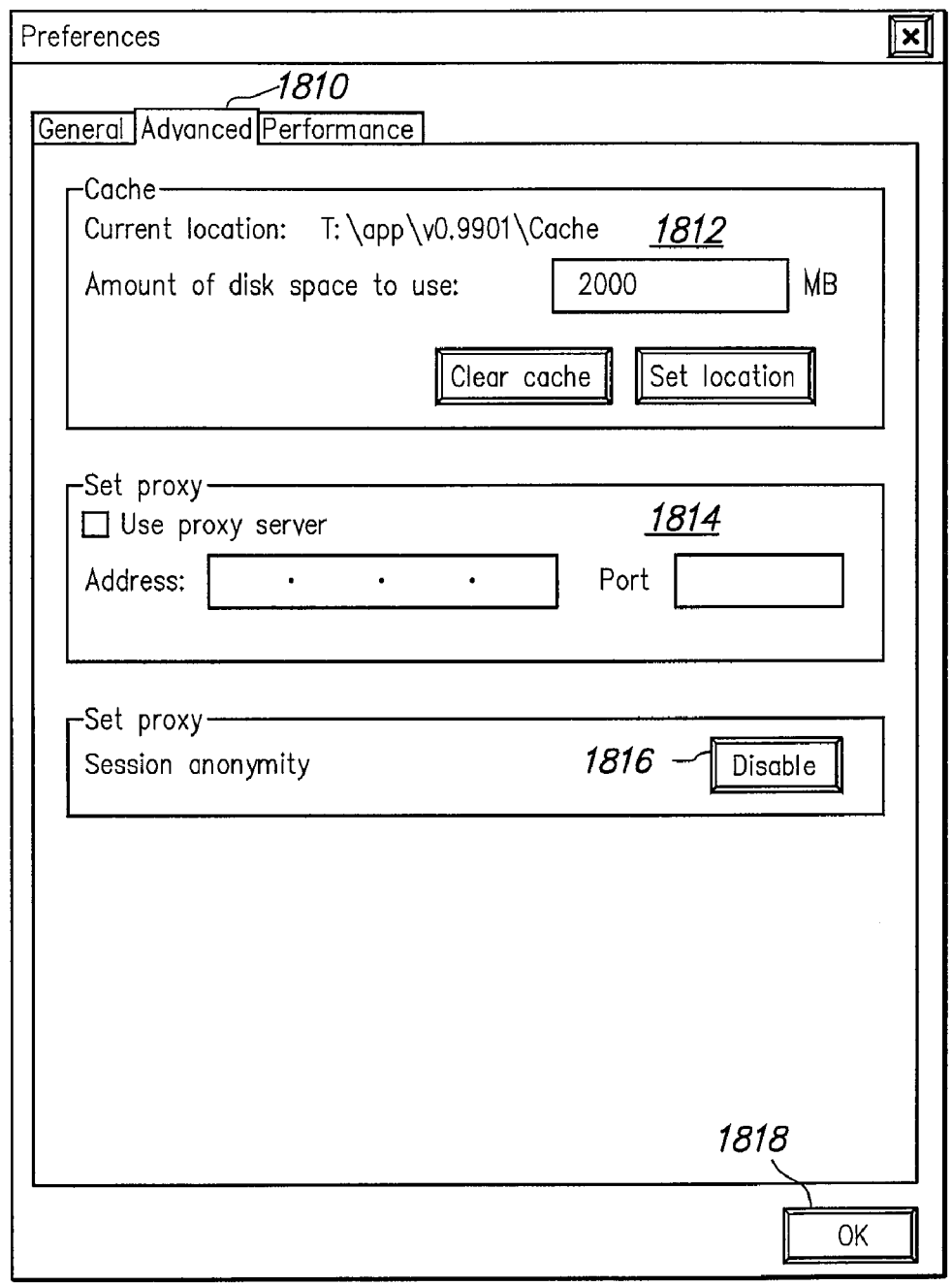
FIG. 18B is a diagram of the panel of FIG. 18A showing an Advanced tab.
Figure 18C:
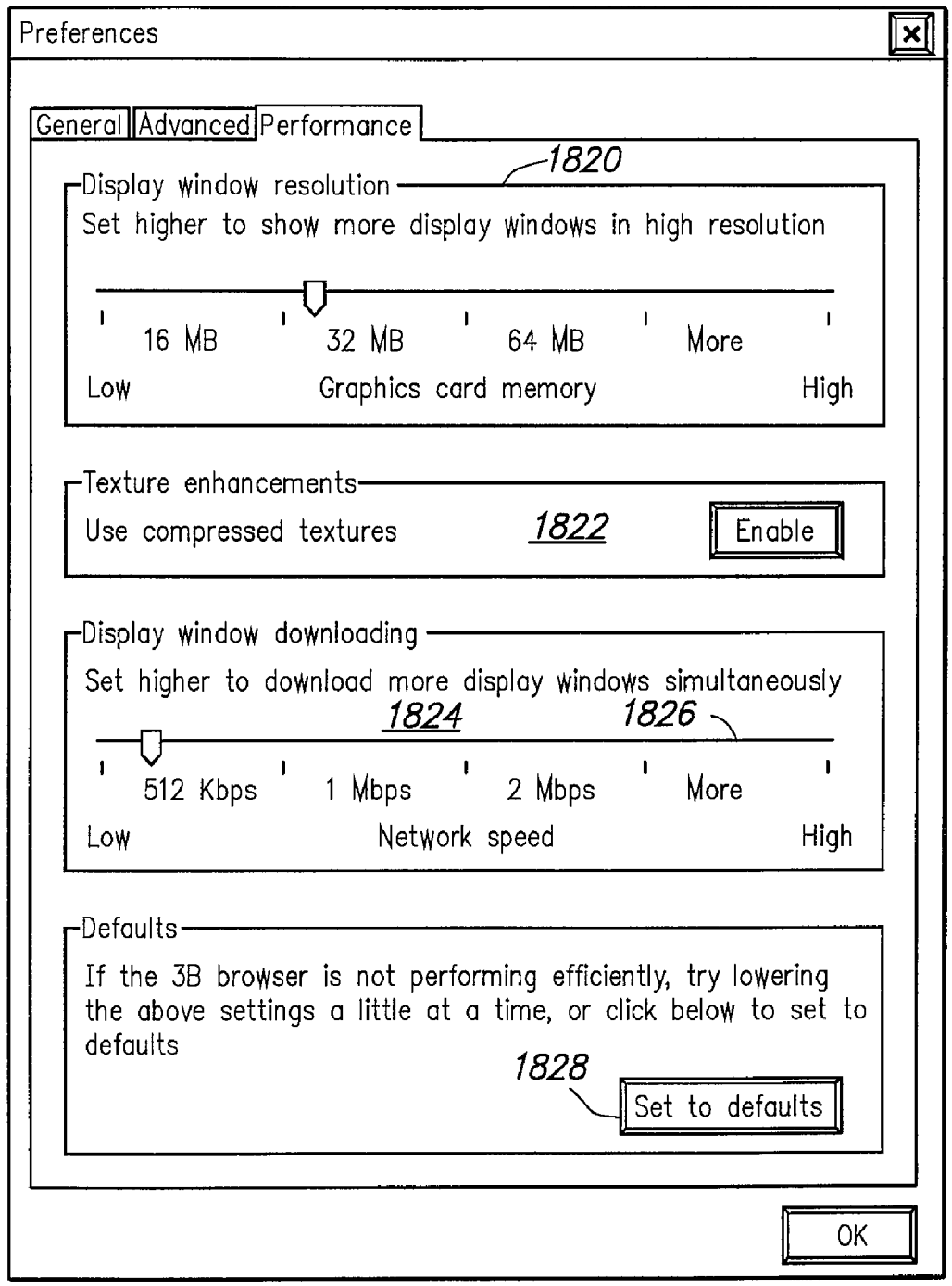
FIG. 18C is a diagram of the panel of FIG. 18A showing a Performance tab.

An Options menu provides functions for changing viewer movement speed and preferences. Selecting a Preferences function causes the browser to display a dialogue box for receiving data values associated with user preferences. FIG. 18A is a diagram of a user interface preferences panel showing a General tab; FIG. 18B is a diagram of the panel of FIG. 18A showing an Advanced tab. FIG. 18C is a diagram of the panel showing the Performance tab. Referring first to FIG. 18A, a General tab 1804 of panel 1802 enables a user to create and store information defining a starting virtual city, including a city URL or other identifier in an Address field 1806. A Content region 1808 enables the user to enable viewing of adult-oriented cities or set an age rating.

Referring now to FIG. 18B, an Advanced tab 1810 comprises a Cache region 1812, Proxy region 1814 and Privacy region 1816 that respectively enable a user to clear a cache of virtual city information, set the location of the cache and its size. The clearing of the cache can offer the option of whether to completely clear the cache or alternatively to only clear high resolution textures. The latter option may enable future visits to the city to be faster. Proxy region 1814 enables a user to set up a proxy server. Privacy region 1816 allows the user to choose whether user navigation should be anonymous. With session anonymity, user-identifying information is omitted from logs that are generated by the browser and uploaded to the city server, as further described below.

Referring now to FIG. 18C, a Performance tab comprises a Display window resolution region 1820, a Texture enhancements region 1822, a Display window downloading region 1824 and a Defaults region 1828. The Display window resolution region 1820 allows the user to adjust the number of high resolution textures seen in the virtual three-dimensional space, using the graphics card memory as a guide. The Texture enhancements region 1822 allows the user to enable or disable compressed textures. The Display window downloading region 1824 allows the user to reduce the number of display windows that the browser attempts to simultaneously download and create content for, using a network bandwidth slider 1826. The device's network connection speed is used as a guide. The Defaults region 1828 allows the user to set the Performance settings back to default.

Referring to FIG. 15A, when the browser is displaying the Map View, input interface area 1206 comprises an input box 1504, a Landmark/Category drop-down menu 1506, and a Find or Go button 1508. In an embodiment, the foregoing configuration of the interface area 1206 is also used for the 3B View of FIG. 12. However, when a user viewing the 3B View enters data in the interface area 1206, in response, the browser changes to the Map View to display results of the data entry. Status box 1502 is displayed below the input box 1504. In one embodiment, a city name also may be displayed in the status bar. When the browser is showing the 3B View, status box 1502 displays a Display name of the window that is in focus. In an embodiment, the contents of the status bar 1502 are removed when the next user keystroke occurs. When the browser is showing the Map View, status box 1502 displays a current virtual destination of the user. If multiple responses may be made, then the status box 1502 may display, "Selection shown: 'Art' locations in TheCity. Click on a destination."

If the browser is unable to find a location entered by the user, then the browser may display an error message in status box 1502, such as "No locations found: 'thesite.com' in TheCity."

A user may enter a location in a virtual city within input box 1504. Information entered in input box 1504 may comprise a display name of a virtual display window, a window description, a location identifier for a location within a virtual city, a category, a virtual street address, etc. In one embodiment, input box 1504 is linked to parser logic that can determine the nature of the information entered and initiate an appropriate search of the data definition of the city to determine if a match occurs. Entering a location followed by selecting the Find or Go button 1508, or pressing an Enter button on a client computer keyboard, causes the browser to search for the specified location; if the location is found in the virtual city, the browser highlights the specified location(s) in the Macro Map 1540.

Referring again to FIG. 13, when the browser is displaying the Web View, a plurality of browser navigation buttons 1304 are displayed in a toolbar region 1301 of screen display 1300. In one embodiment, the navigation buttons 1304 may comprise selectable images, buttons or hyperlinks associated with navigation to a home location, forward navigation, backward navigation, re-loading a current page, and stopping loading of a page. Further, in one embodiment, a graphical shadow 1306 may be displayed to separate input area 1206 from 3B button area 1222. In another embodiment, navigation buttons 1304 may provide "mouse-over" versions such that when a cursor is moved over any of the navigation buttons, an appearance of the underlying navigation button changes. Navigation buttons 1304 also may have an inactive state in which the buttons are grayed out and non-functional. For example, the Forward button among buttons 1304 is active only after the Back button has been selected; otherwise the Forward button is inactive and grayed-out.

Further, web button area 1204 does not display an image of a web page, because main pane 1220 displays the web page 1310; in an embodiment, a static or dynamic graphical logo is displayed. An input box 1307 in input area 1206 may receive a network location of a conventional web page and may comprise a Go button 1308 which, when selected by a user, causes the browser to load and display the specified page 1310 in two-dimensional conventional web page format in main pane 1220.

Aspects of embodiments of the Map View are now described with reference to FIG. 14, FIG. 15A, FIG. 15B. As shown in FIG. 14, graphical lines or shadows 1402 may be provided to separate the web button area 1204 and 3B button area 1222 and indicate that such areas are in the background when a Map View is displayed. In one embodiment, the Map View includes user interface elements that enable a user to search for virtual windows, districts, or locations within a virtual environment. For example, a user may wish to search for a 3B Location or City. An example of a 3B Location within a virtual city is "20 Fourth Street" or "Joe Bloggs". An example of a virtual city might be "TheCity". A user may also wish to search for a location category or a landmark.

In one embodiment, when the browser is displaying the 3B View or Map View, additional search fields are provided as part of the input area 1206. For example, input area 1206 may include a data entry dialog box labeled "Enter the name of a 3B Destination," and a "Find" button which, when selected by a user, causes the browser to find a path from the user's then-current virtual location to the specified 3B Location.

With this embodiment, users may potentially enter a URL or a word in the "3B Location" field. If a URL is entered, then in response, the browser searches the city to determine whether a web page with the same or very similar URL is then-currently associated with a virtual display window. If so, then the browser highlights destination(s) within the city on the macro map. If only one virtual display window is associated with the specified URL, then the browser additionally displays a graphical path from the user's then-current virtual location to the matching virtual display window. If several virtual display windows are associated with the URL, then all the windows are highlighted, and the status bar 1502 displays a message such as "Select your destination." If the specified URL doesn't exist in the current virtual city, then the status box displays a messages such as "No locations found". If the specified URL is not a valid URL, then the status bar 1502 displays an error message of the type used in a conventional web browser.

If a user enters one or more keywords in the "3B Location" field, then in response, the browser searches for the specified keywords within all URLs that are associated with virtual display windows within the city. The search may also encompass Display Name values for the virtual display windows, Display description values for the virtual display windows, category name values, and street address values. If no matching virtual display windows are found, then the status bar 1502 displays an error message. If one match is found, then a path is displayed in the map from the user's current virtual location to the matching location. If multiple matching locations are found, then all are highlighted in the Map View, and the status bar 1502 displays a message such as "Select your destination". Additionally or alternatively, the status bar 1502 may display the keywords that were searched.

Figure 16:
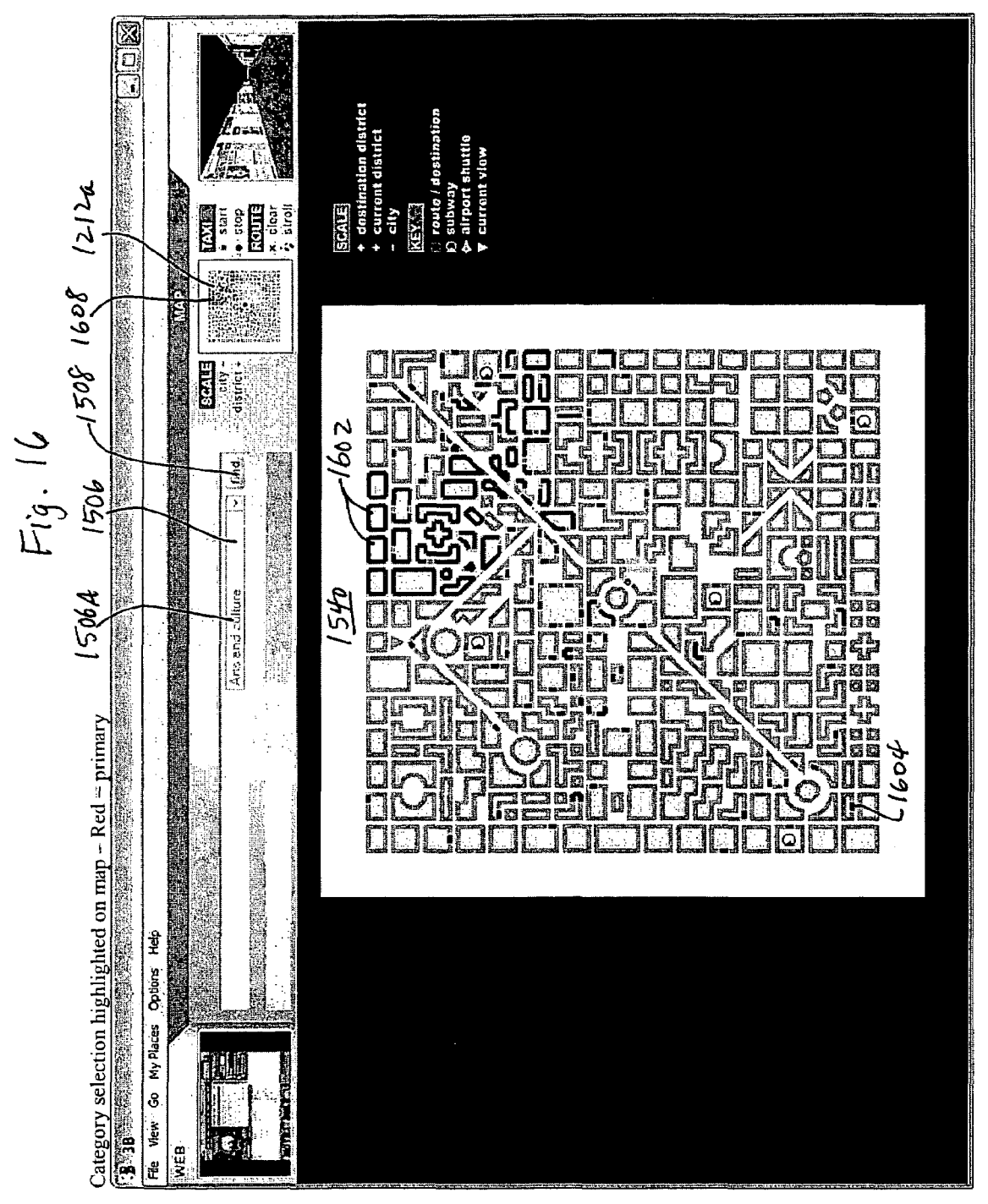

As shown in FIG. 15A, input area 1206 may include a Landmark/Category drop-down menu 1506. In an embodiment, selecting drop-down menu 1506 causes the browser to display a list of landmarks, a divider, and a list of categories. Landmarks are points of interest in a virtual city. Categories are subject matter areas in which virtual display windows may be classified. In one embodiment, selecting a category causes the browser to display the map view which highlights the locations of corresponding virtual display windows in the specified category. FIG. 16 is a diagram of the screen display of FIG. 15A showing a display of virtual display windows that match a selected category. In the example of FIG. 16, a user has selected an "Arts and culture" category 1506A using drop-down menu 1506, and Macro Map 1540 shows matching virtual display windows 1602, 1604 with highlighting. The matching windows may be clustered in one region, as indicated by windows 1602, or located in other locations, as with window 1604. Windows which have a secondary category which matches the category selected will be highlighted in a lighter shade of color.

In any of the above approaches for processing searches, if the browser is displaying a District-scale Map View, and any element of a search result is not in a district, but is within the city, then the browser changes the display to the City scale, effectively zooming out the view. Otherwise, in an embodiment, a display of search results generally is provided in the scale of District or City that was in effect at the time that the search query was issued, except that if the user is in the District scale Map View and the start point and chosen destination are in different districts, then the display changes to the City scale Map View.

Referring now to FIG. 14, a screen display 1400 that presents a District scale view 1410 may comprise direction arrows 1412 and one or more virtual buildings 1414 each comprising virtual display window locations 1416. A particular district 1424 may comprise buildings 1414 arranged in a generally rectilinear grid that is delineated by virtual streets 1426. In an embodiment, a particular district 1424 is displayed in a brighter color scheme and parts of a virtual city surrounding the district are grayed-out or shown in a different color scheme. If a particular district 1424 adjoins a boundary of a virtual city, then a label may be displayed to indicate the location of the boundary. Street labels may be provided, for example, in a District scale view of a macro map.

In one embodiment, virtual buildings 1414 that are relatively tall may be depicted in screen display 1400 using shadows; however, shadows are not required. In an embodiment, each building has a shadow of a particular color and oriented in a consistent particular direction and the length of the shadow generally indicates the height of the building. Alternatively, a stepped shadow display approach is used in which, for example, virtual buildings having 2-5 storeys are displayed with a small shadow, and virtual buildings having more than 5 storeys are displayed with a larger shadow. If the virtual city includes virtual buildings 1414 that have perimeter shapes arranged as different polygons, then the shadow is based on the ground-floor perimeter polygon shape. In an embodiment, shadows are only indicated on Macro Map district view.

In one embodiment, a virtual position of a user or viewer is indicated on the map by a dot with a V-shape to indicate viewing direction. The viewer's position is static in the macro-maps, and in the mini map while the user is in Map View. In an embodiment, in the mini maps, the virtual position of the user is always shown at the centre, and the V moves around indicating the direction one is traveling; in this embodiment, the map does not rotate. If the V is facing up then the direction is North, for example. While the browser is displaying the 3B View, the mini map scrolls and an indicator of the position of the user moves based on the user's movement. While in the Map View, the mini map and user's position are static. In the City scale macro-map view, the virtual user position is shown in an actual position within the city rather than always at the center, because all the city is in view. Other arrangements may be provided in other embodiments such as allowing the mini map to rotate around a statically positioned V.

Screen display 1400 further may comprise a Landmark/Category drop-down menu 1401 which, when selected, provides a "Landmarks" heading followed by a list of landmarks defined in the virtual city and a "Category" heading followed by a list of categories defined in the virtual city. Selecting a landmark causes the browser to display a route to the selected landmark in the map. Use of categories and display of matching windows is further described herein.

In one embodiment, a Map View may depict one or more gateways in the form of graphical icons. A gateway graphical icon may be logically associated with a virtual display window. In an embodiment, in the City scale Map View of FIG. 15A, gateway icons are displayed in a centre window of a building 1414. Icons 1522 of FIG. 15A are examples of icons that may be used to indicate a subway station.

The foregoing elements and icons of the Macro Map 1540 of FIG. 15A may be used generally consistently in displays of the Mini map 1212. In a City scale Map View as seen in FIG. 15A a user's current position may be indicated by an eye icon 1530, which may rotate as the user moves through the city.

Labels or names of virtual streets 1426 of FIG. 14 may be displayed in association with the streets. In an embodiment, not all labels are displayed to prevent displaying a cluttered map. In an embodiment, such street labels are configured as a top layer of the Map View, such that displays of paths or other elements of the Map View do not cover the street labels.

In one embodiment, selecting a direction arrow 1412 causes the browser to re-display the Macro Map View at District scale but showing an adjacent district as indicated by the direction arrow. In an embodiment the Mini map 1212 is not updated or re-displayed in a corresponding manner because the user is always at the center of the mini map. In an embodiment, instead of selecting arrow 1412 the keyboard may be used by selecting the up arrow and corresponding down, left and right arrows as appropriate.

In one embodiment, each virtual display window location 1416 is displayed as a segment of a building 1414. In operation, in one embodiment, when a user moves a cursor over a particular building 1414, a pop-up menu 1420 is displayed containing virtual window display names 1422 for each of the virtual display window locations 1416 in the associated city block. The locations 1416 may be colored and the colors of the locations may correspond to virtual display window names 1422 in the menu 1420. In one embodiment, when a user moves a cursor location 1428 through the pop-up menu 1420, the associated window location 1429 also turns black. If a gateway is present in the associated city block, the name of the gateway may be displayed in the menu 1420 in a different color. A virtual window display name 1422 or gateway in the menu 1420 is selected by releasing a mouse button over the menu, and causes the browser to highlight the corresponding location in both the Macro Map View and the Mini map 1212.

In an embodiment, Map View elements may be highlighted in a plurality of colors. For example, in the embodiment of FIG. 14, four colors are used, and a color key 1440 is provided in Map View 1410. In one embodiment, a route color and destination color are provided, and each color is different. Alternatively, the route color and destination color are the same. The destination color is used to highlight locations representing results of location searches. Other indicators may represent locations of subway stations, airport shuttles, etc. Colors may also indicate paid advertising locations. The Current view indicates the V shape which shows the viewers current location and viewing direction within the city.

In another embodiment, Map View 1410 includes a Zoom menu 1442. Functions in Zoom menu 1442 may include a "+destination district" function that changes the map to the view of the destination district, and a "+current district" function that changes the map to the view of the current district where the viewer is located, or performs no action if the user is already in that position. In an embodiment, the "+current district" function performs the same action as selecting the "District" link 1306a associated with the Mini Map 1212. The Zoom menu 1442 may also include a "−city" function that changes the map to the City scale. The "−city" function thus performs the same action as selecting the "City" link 1306b associated with the Mini Map 1212.

Referring again to FIG. 15A, in one embodiment, a Map View at City scale comprises a virtual city map 1540 that comprises no street names, no building shadows, but shows all gateways and no other landmarks or advertisers. The eye icon 1530 indicates a user's then-current virtual position. In the embodiment of FIG. 1SA, a user may position a mouse cursor over a particular building 1414, and in response, a pop-up menu 1550 is displayed. In an embodiment, pop-up menu 1550 includes display names of associated virtual display windows of the particular building associated with the menu. Virtual display window labels are omitted, but as a cursor position in the menu 1550 changes, an associated virtual display window of the particular building is highlighted.

If a user moves from a City scale Map View to a District scale Map View while there is a path highlighted, then the browser displays the district that contains the user's then-current virtual position. Such a district is considered within a default District scale Map View.

In an embodiment, a Scale menu 1560 is displayed in association with virtual city map 1540. The Scale menu 1560 may comprise links or buttons for changing a scale of the map or districts within the map. For example, links or buttons may comprise zoom-in links or buttons for displaying a destination district or current district at District scale and a zoom-out button for re-displaying the map at City scale.

As seen in FIG. 15B, selecting a virtual display window name in pop-up menu 1550 causes the browser to display a path 1570 from the user's current position 1530 to a destination 1572. The path is also highlighted in the Mini map 1212a as indicated by path 1574 in FIG. 15B. If the user subsequently selects the 3B View, the path 1574 remains highlighted in the Mini map 1212 of that view. In an embodiment, when a user selects the destination 1572, as by double-clicking on that window, the browser commences the stroll process described above, in which the display changes to the 3B View, and a virtual traversal from the current user position to the destination window is displayed.

Further, in one embodiment, when a path 1570 is highlighted in the Map View, the taxi movement selector 1214 becomes active and is highlighted, and the user can select the virtual taxi function described above. The taxi movement selector 1214 is displayed may be displayed as grayed-out or unavailable when no destination has been selected. If the user selects the taxi function and subsequently selects the stop link of the taxi function, then the destination 1572 is saved, and the path 1574 may continue to be highlighted on the Mini map 1212a. If the user then selects the Map View, the destination 1572 is highlighted, and the path 1570 is displayed. In another embodiment, the destination virtual display window 1572 and the path 1570 cease to be highlighted when the user arrives at the destination.

The map views described herein may be implemented as a plurality of graphical layers, in which higher layers obscure lower layers during display operations. For example, in one embodiment, the following layer priority is observed, from lowest layer to highest. A base layer provides an outline of the complete map and the building outlines. A route highlight layer is next in order, followed by street labels, user position indicators, and pop-up menus.

Figure 17:
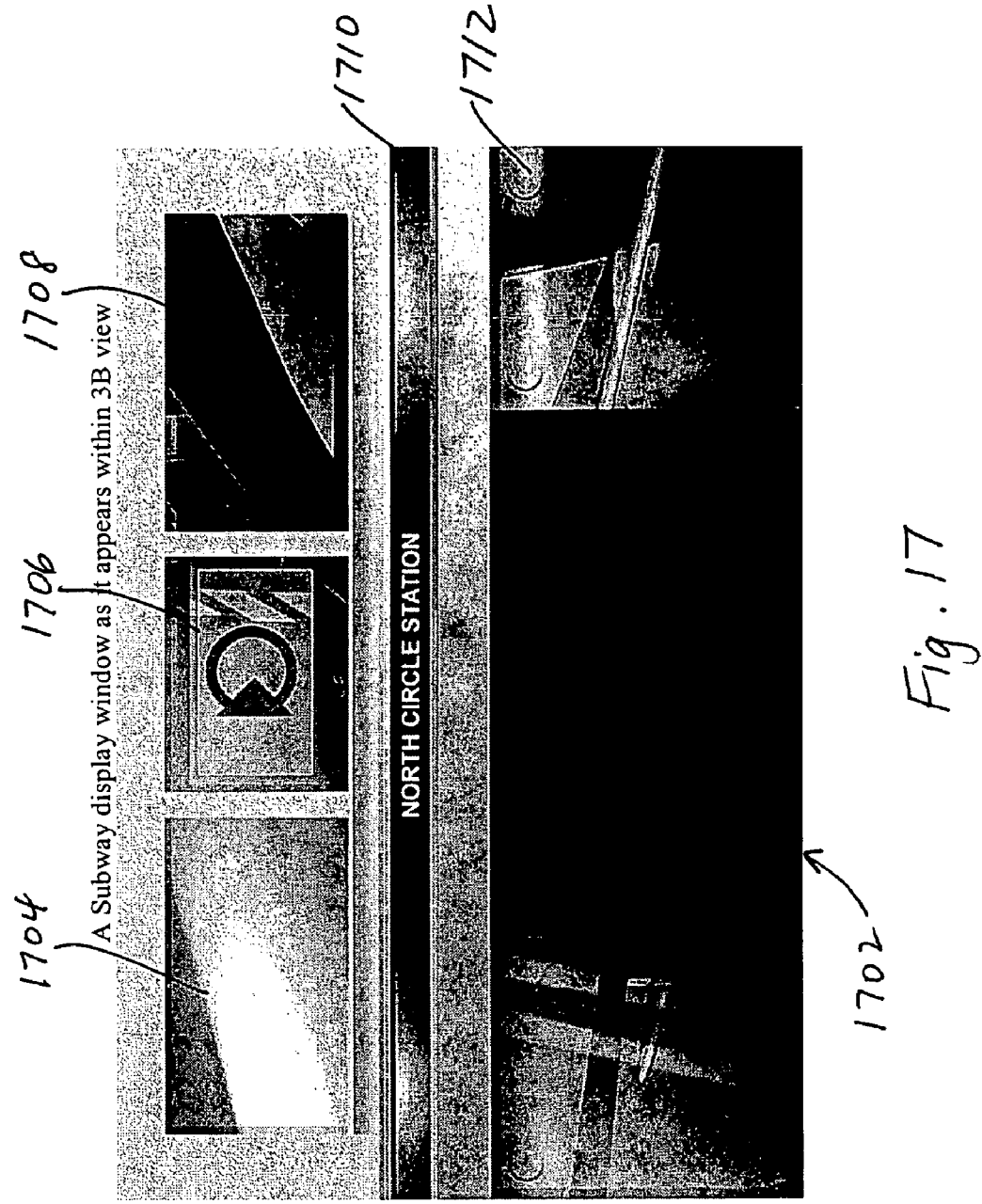
FIG. 17 is a diagram of a screen display of an entrance to a virtual subway station.

FIG. 17 is a diagram of a screen display of an entrance to a virtual subway station that is generated when a viewer navigates to a subway station location while using the three-dimensional view of the browser. A virtual subway provides a rapid way of moving in a virtual city without navigating through all streets that lie between a start point and a destination point. In an embodiment, when a viewer is in the 3B View, while navigating in a virtual city the viewer may view one or more subway display windows 1702 as in FIG. 17. The subway name 1710 is shown on the display window 1702. The user faces the subway station display window 1702 and selects anywhere on the display window. In response, a subway map appears in the form described above. The user then selects a subway station symbol of a station at a desired destination. In response, the browser displays the name of the destination station. Selecting the subway station name label causes the browser to move the user's virtual position to the destination station, and to change the browser view to the 3B View such that the user is facing the front of the destination subway station. In addition to subway stations there may also be train stations which similarly provide rapid transport links between the current virtual three-dimensional space and specific locations in other virtual three-dimensional spaces. Both subway and train stations may be combined on one transport map. In one embodiment each station is either a subway or train station. In another embodiment there could be stations that are combined subway and train stations.

A user can rapidly navigate to a subway station by using the Go menu of menu 1208 and selecting the nearest subway station.

3.0 HARDWARE OVERVIEW

Figure 11:
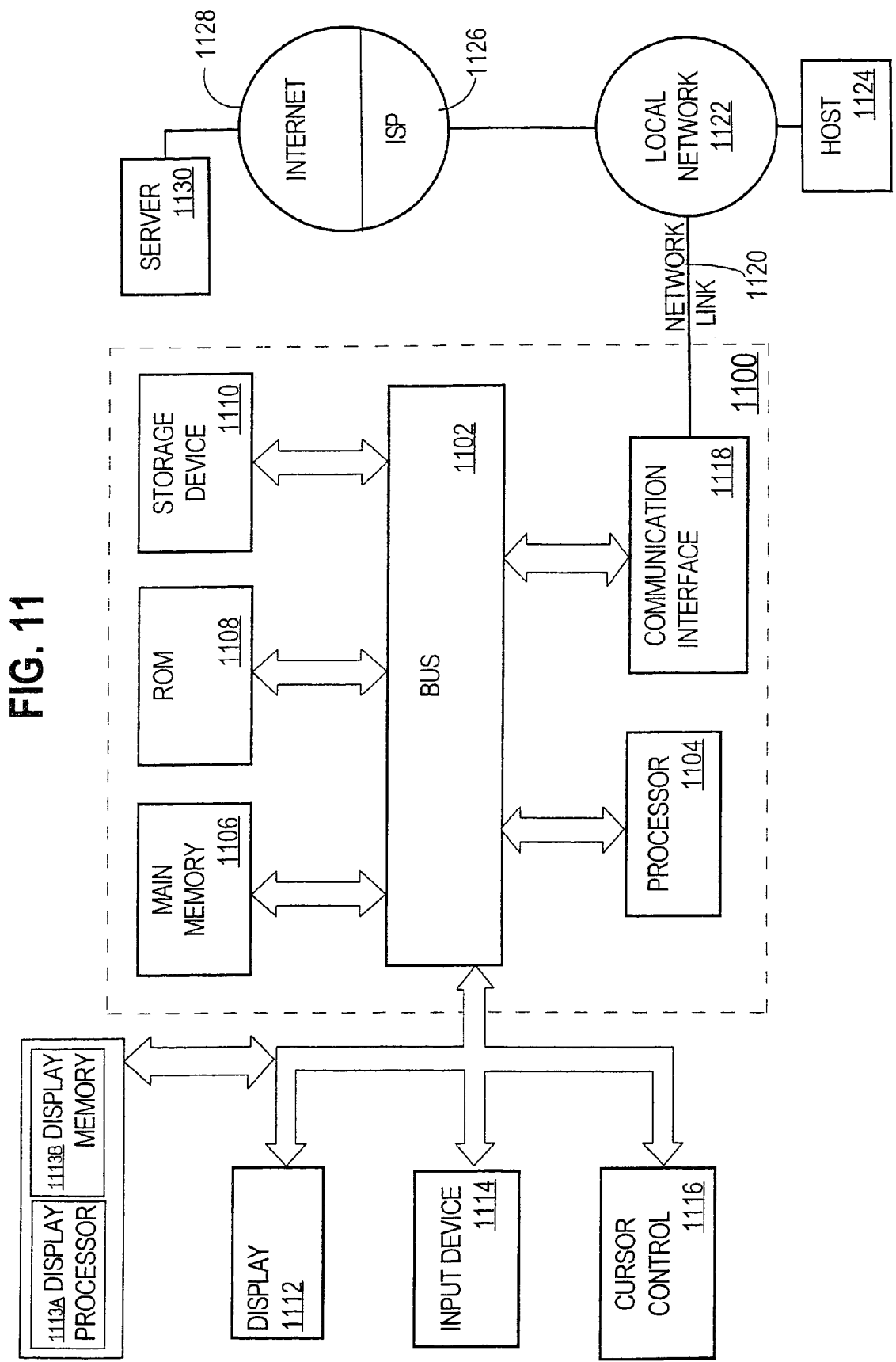
FIG. 11 is a block diagram that illustrates a computer system upon which an embodiment of the invention may be implemented.

FIG. 11 is a block diagram that illustrates a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. Computer system 1100 may comprise a display processor 1113A and display memory 1113B coupled to bus 1102 for the purpose of storing image information and driving display 1112. For example, a display processor and display memory may be provided as part of a graphics card in the computer system 1100. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another machine-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1100, various machine-readable media are involved, for example, in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. The received code may be executed by processor 1104 as it is received, and/or stored in storage device 1110, or other nonvolatile storage for later execution. In this manner, computer system 1100 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-readable storage medium, comprising one or more sequences of instructions which, when executed by one or more processors, cause the one or more processors to:
   display a graphical user interface for a virtual space browser having a main pane containing a three-dimensional perspective view of a virtual three-dimensional space that comprises a plurality of virtual display windows,
   wherein the virtual display windows are displayed on sides of virtual buildings of a virtual city, and
   wherein one or more virtual channels separate the virtual buildings, wherein the virtual display windows are aligned along the virtual channels;
   wherein each of the virtual display windows is allocated a specific position in the space and one or more display windows are associated with a network location identifier of a content provider;
   display an interactive content button area, a mini map area, and a three-dimensional view button area in a linear relationship among one another at a position adjacent to the main pane;
   display, in the three dimensional view button area, a reduced-size representation of a three dimensional perspective view of a position in a virtual three-dimensional space;
   display an interactive content view of network content associated with the network location identifier, and when the interactive content view is displayed, display the three-dimensional perspective view of the virtual three-dimensional space in response to receiving user input selecting the three-dimensional view button area;
   further comprising instructions which, when executed by one or more processors, cause the one or more processors to perform the step of displaying a map view in the main pane comprising a two-dimensional planar map of the virtual three-dimensional space; and
   displaying, in the map view, each of the virtual display windows as a line segment of a box representing one of the virtual buildings;
   receiving second user input indicating moving a cursor over a particular virtual building;
   in response to the second user input, displaying a pop-up menu containing names of each of the virtual display windows of the particular virtual building.

2. A computer-readable medium according to claim 1, further comprising instructions which, when executed by one or more processors, cause the one or more processors to perform the step of displaying the interactive content view in the main pane instead of any other content.

3. A computer-readable medium according to claim 1, further comprising instructions which, when executed by one or more processors, cause the one or more processors to perform the step of displaying the map view in the main pane instead of any other content.

4. A computer-readable medium according to claim 1 further comprising instructions which, when executed by one or more processors, cause the one or more processors to perform the step of displaying an input area separate from and adjacent to the main pane.

5. A computer-readable medium according to claim 1 further comprising instructions which, when executed by one or more processors, cause the one or more processors to perform the step of displaying a mini map area.

6. A computer-readable medium according to claim 1 further comprising instructions which, when executed by one or more processors, cause the one or more processors to perform the step of displaying a three dimensional view button area.

7. A computer-readable medium according to claim 1, further comprising instructions which when executed by one or more processors, cause the one or more processors to perform the steps of displaying a menu.

8. A computer-readable medium according to claim 1, further comprising instructions which when executed by one or more processors, cause the one or more processors to perform the steps of displaying a status box area.

9. A computer-readable medium according to claim 1, further comprising instructions which, when executed by one or more processors, cause the one or more processors to perform the steps of additionally displaying an input area in a generally linear relationship among one another at a position adjacent to the main pane.

10. A computer-readable medium according to claim 1, further comprising instructions which, when executed by one or more processors, cause the one or more processors to perform the step of:
    displaying, in the interactive content button area, a reduced-size representation of interactive content that is associated with a virtual location within the virtual three-dimensional space.

11. A computer-readable medium according to claim 1, further comprising instructions which, when executed by one or more processors, cause the one or more processors to perform the step of:
    when the main pane is displaying the map view—
    displaying, in the interactive content button area, a reduced-size representation of interactive content that is associated with a virtual location within the virtual three-dimensional space.

12. A computer-readable medium according to claim 1, further comprising instructions which, when executed by one or more processors, cause the one or more processors to perform the step of:
    when the main pane is displaying the three-dimensional perspective view—
    displaying, in the interactive content button area, a reduced-size representation of interactive content that is associated with a virtual location within the virtual three-dimensional space.

13. A computer-readable medium according to claim 1, further comprising instructions which, when executed by one or more processors, cause the one or more processors to perform the step of:

receiving a user interaction with an interactive content view link; and in response to the interaction displaying the interactive content view.

14. A computer-readable medium according to claim 13, further comprising instructions which, when executed by one or more processors, cause the one or more processors to perform the step of:

causing the interactive content view to be displayed in the main pane.

15. A computer-readable medium according to claim 1, further comprising instructions which, when executed by one or more processors, cause the one or more processors to perform the step of:

responding to a user interaction with an interactive content view link where the interactive content view link is the reduced-sized representation of interactive content.

16. A computer-readable medium according to claim 1, further comprising one or more stored sequences of instructions which, when executed by one or more processors, cause the one or more processors to perform the steps of:

mapping a plurality of display windows within the virtual three-dimensional space so that each display window is allocated a specific and predetermined position in the space, rendering each display window in three-dimensional perspective according to its position and angle relative to a viewer's virtual position in the virtual space, cross-referencing the position of each display window to a network address or storage location of the material content that is designated to be rendered in that particular display window at a particular time based on at least one predetermined condition, allocating at least part of the three-dimensional virtual space to display windows whose content is not chosen or determined by the viewer, selecting, retrieving and preparing material content for possible subsequent display, according to a predetermined algorithm, selecting and rendering prepared material content within its cross-referenced display window, according to a predetermined algorithm, providing a means of virtual navigation that changes the viewer's position in the space in such a manner as to simulate movement through a plurality of predefined channels in the virtual space.

17. A computer-readable medium according to claim 1 further comprising instructions which, when executed by one or more processors, cause the one or more processors to perform receiving third user input indicating moving the cursor through the pop-up menu to one of the names;

in response to the third user input, re-displaying the line segment corresponding to the one of the names using a specified color.

\* \* \* \* \*